US012669970B2

(12) United States Patent
Asai et al.

(10) Patent No.: US 12,669,970 B2
(45) Date of Patent: Jun. 30, 2026

(54) IMAGE TRANSMISSION SYSTEM AND IMAGE TRANSMISSION APPARATUS

(71) Applicant: NTT DOCOMO, INC., Tokyo (JP)

(72) Inventors: Yuudai Asai, Chiyoda-ku (JP); Sae Kimura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 18/723,898

(22) PCT Filed: Nov. 16, 2022

(86) PCT No.: PCT/JP2022/042547
§ 371 (c)(1),
(2) Date: Feb. 4, 2025

(87) PCT Pub. No.: WO2023/132132
PCT Pub. Date: Jul. 13, 2023

(65) Prior Publication Data
US 2025/0181293 A1 Jun. 5, 2025

(30) Foreign Application Priority Data

Jan. 7, 2022 (JP) ................................. 2022-001394

(51) Int. Cl.
*G06F 3/01* (2006.01)
*G06F 3/14* (2006.01)
(52) U.S. Cl.
CPC ................ *G06F 3/14* (2013.01); *G06F 3/013* (2013.01)
(58) Field of Classification Search
CPC ....... G06F 3/013; G06F 3/14; H04N 21/2187; H04N 21/258; H04N 21/2665; G06T 7/00; G06T 7/70
See application file for complete search history.

(56) References Cited

U.S. PATENT DOCUMENTS

| | | | | |
|---|---|---|---|---|
| 2013/0083173 A1* | 4/2013 | Geisner | ................. | G06T 19/006 |
| | | | | 348/51 |
| 2013/0097635 A1* | 4/2013 | Yerli | .................. | H04N 21/2187 |
| | | | | 725/37 |
| 2016/0182940 A1* | 6/2016 | Assayag | ............ | H04N 21/4722 |
| | | | | 725/62 |

(Continued)

FOREIGN PATENT DOCUMENTS

JP 2021-153257 A 9/2021

OTHER PUBLICATIONS

International Search Report issued Jan. 24, 2023 in PCT/JP2022/042547 filed Nov. 16, 2022, therein, 4 pages.

*Primary Examiner* — Ryan A Lubit

(74) *Attorney, Agent, or Firm* — Oblon, McClelland, Maier & Neustadt, L.L.P.

(57) ABSTRACT

A first image capture apparatus captures a first image of a performer in a theater from a position of a virtual first seat that has been set in the theater. A second image capture apparatus captures a second image including the performer from a position different from the position of the first image capture apparatus. A detector detects a direction of line of sight of the performer. A transmission controller transmits the second image to a terminal apparatus of a viewer associated with the virtual first seat, and transmit the first image to the terminal apparatus based on the direction of the line of sight of the performer having turned toward the virtual first seat.

12 Claims, 15 Drawing Sheets

(56)　　　　　References Cited

U.S. PATENT DOCUMENTS

| | | | | |
|---|---|---|---|---|
| 2018/0095635 | A1* | 4/2018 | Valdivia | G02B 27/0093 |
| 2018/0098059 | A1* | 4/2018 | Valdivia | G06F 3/0482 |
| 2018/0374268 | A1* | 12/2018 | Niles | H04N 21/21805 |
| 2019/0104235 | A1* | 4/2019 | Sarkar | H04N 21/816 |
| 2019/0358547 | A1* | 11/2019 | Mack | H04N 21/2187 |
| 2020/0289934 | A1* | 9/2020 | Azmandian | G06F 3/012 |
| 2020/0404219 | A1* | 12/2020 | Yerli | G06T 19/20 |
| 2022/0247975 | A1* | 8/2022 | Lanier | H04L 12/1822 |

* cited by examiner

TERMINAL APPARATUS 40-1

TERMINAL APPARATUS 40-2

TERMINAL APPARATUS 40-7

Figure 1:
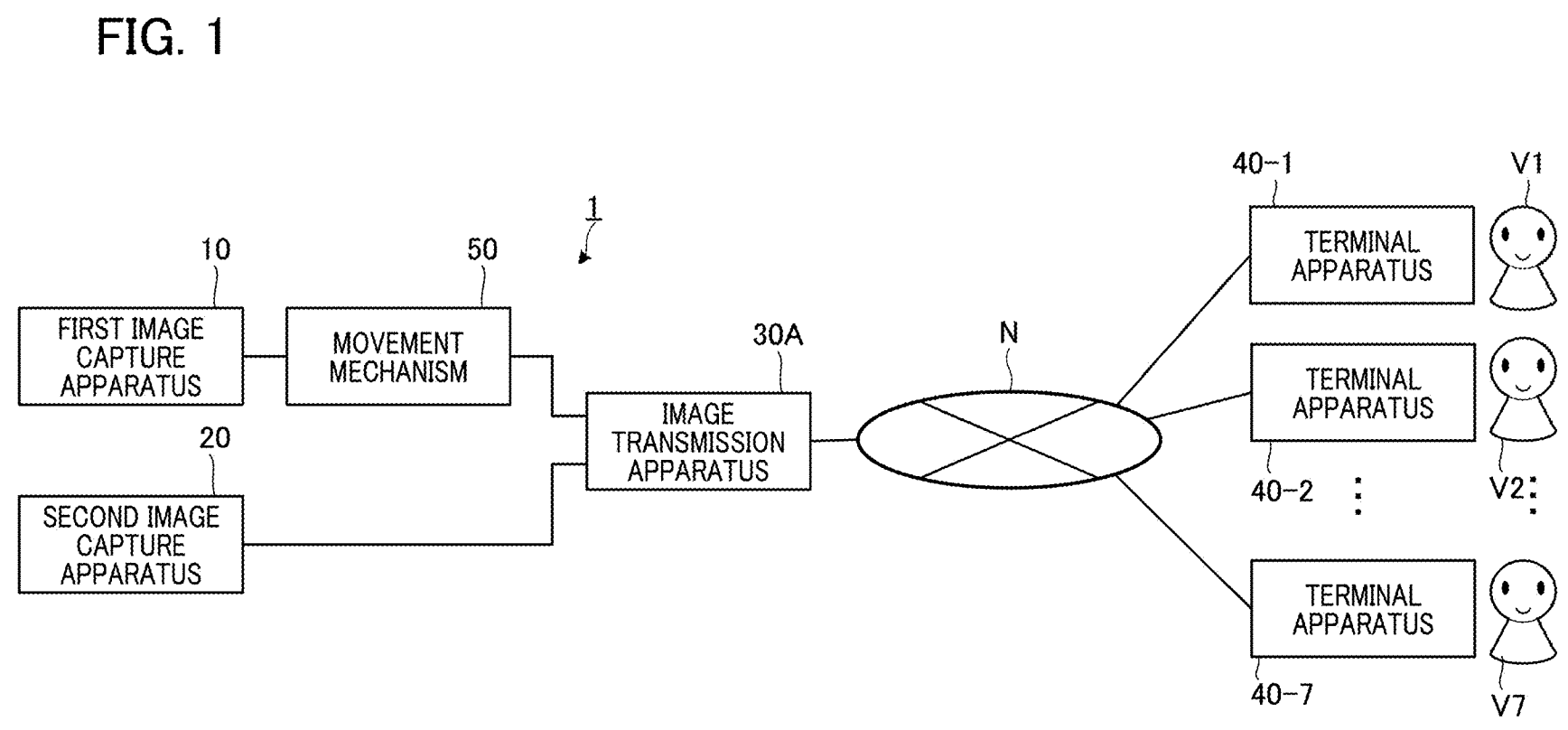

N

30A

IMAGE TRANSMISSION APPARATUS

1

50

MOVEMENT MECHANISM

10

FIRST IMAGE CAPTURE APPARATUS

20

SECOND IMAGE CAPTURE APPARATUS

IMAGE TRANSMISSION SYSTEM AND IMAGE TRANSMISSION APPARATUS

TECHNICAL FIELD

The present invention relates to image transmission systems and to image transmission apparatuses.

BACKGROUND ART

A so-called online live show that transmits images (generally, moving images) of a performance of music, a theatrical play, a dance, or the like to terminal apparatuses of users via a network has become widespread. For example, Patent Document 1 cited below discloses a live show video distribution system. A Video data processor switches among input camera videos on the basis of music analysis data or a result of an analysis performed by a Video analyzer, to output the camera Video that has been switched to. The Video data processor detects a specific person from the camera videos and switches to a video focused on the specific person in response to a change of audio or a change of Videos in a piece of music to output the video that has been switched to. The video data processor switches to a video in response to a request transmitted from a user terminal to output the video that has been switched to, and transmits the video to the user terminal via a video distribution apparatus and a streaming server.

RELATED ART DOCUMENT

Patent Document

Patent Document 1: Japanese Patent Application, Laid-Open Publication No. 2021-153257

SUMMARY OF THE INVENTION

Problems to be Solved by the Invention

An online live show is very convenient in enabling viewing of a performance even if a viewer cannot come to the live show venue. In addition, experiences such as a personal interaction between a performer and viewers, for example, establishing eye contact between a performer and a spectator, cannot be acquired on an online live show. For example, even if a performer turns the line of sight to an image capture apparatus during an online live show, the image can be viewed by all viewers viewing the online live show. Therefore, the viewers would not think that the performer has turned the performer's gaze on a viewer. As described above, viewing of an online live show has a problem in that the relationship between viewers and a performer is tenuous, and the level of satisfaction of the viewers is lower than in viewing a performance of a live show venue.

An object of the present invention is to enhance the level of satisfaction of viewers in transmitting videos of a performance.

Means for Solving the Problems

An image transmission system according to one aspect of the present invention includes: a first image capture apparatus configured to capture a first image of a first performer in a real space from a position of a virtual first seat that has been set in the real space; a second image capture apparatus configured to capture a second image including the performer from a position different from the position of the first image capture apparatus; a transmission controller configured to transmit the second image to a terminal apparatus of a viewer associated with the virtual first seat; and a detector configured to detect a direction of line of sight of the performer, in which the transmission controller is configured to transmit the first image to the terminal apparatus based on the direction of the line of sight of the performer having turned toward the virtual first seat.

An image transmission apparatus according to another aspect of the present invention includes: a first acquirer configured to acquire a first image of a performer in a real space, the first image being captured by a first image capture apparatus from a position of a virtual first seat that has been set in the real space; a second acquirer configured to acquire a second image including the performer, the second image being captured by a second image capture apparatus from a position different from the position of the first image capture apparatus; a transmission controller configured to transmit the second image to a terminal apparatus of a viewer associated with the virtual first seat; and a detector configured to detect a direction of line of sight of the performer, in which the transmission controller is configured to transmit the first image to the terminal apparatus based on the line of sight of the performer having turned toward the virtual first seat.

Effect of the Invention

According to one aspect of the present invention, it is possible to enhance the level of satisfaction of viewers in transmitting videos of a performance.

BRIEF DESCRIPTION OF THE DRAWINGS

FIG. 1 is a block diagram illustrating a configuration of an image transmission system 1 according to a first embodiment.

FIG. 7 is an explanatory diagram schematically illustrating a switching timing of a transmission image corresponding to the direction L of the line of sight illustrated in FIG. 6.

FIG. 9 is a block diagram illustrating a configuration of an image transmission system 2 according to a second embodiment.

FIG. 13 is an explanatory diagram schematically illustrating switching of a transmission image performed by a transmission controller 316B.

FIG. 14A is a flowchart illustrating an operation of the processing device 306B.

FIG. 15 is an explanatory diagram schematically illustrating a second modification.

MODES FOR CARRYING OUT THE INVENTION

A. First Embodiment

Figure 2:
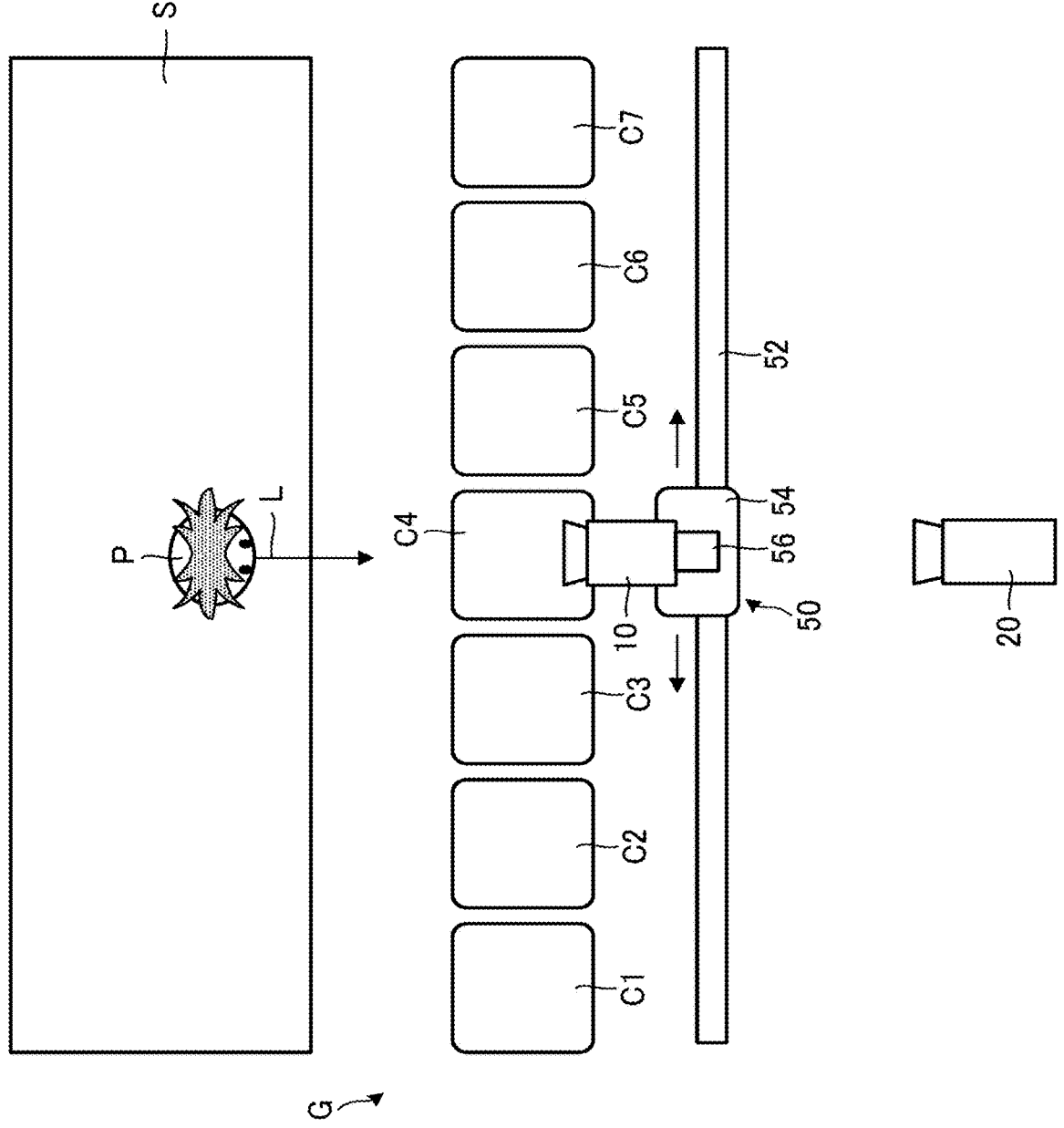
FIG. 2 is an explanatory diagram schematically illustrating an arrangement of a first image capture apparatus 10 and a second image capture apparatus 20.

A configuration of an image transmission system 1 according to a first embodiment of the present invention is explained below.

A-1. System Configuration

FIG. 1 is a block diagram illustrating a configuration of the image transmission system 1 according to the first embodiment. The image transmission system 1 includes a first image capture apparatus 10, a movement mechanism 50, a second image capture apparatus 20, and an image transmission apparatus 30A. The image transmission apparatus 30A. is connected to terminal apparatuses 40-1 to 40-n (n is any integer equal to or greater than one) via a communication network N. Each of the terminal apparatuses 40-1 to 40-n is held by a different one of viewers V1 to Vn. In the present embodiment, viewers V1 to V7 are associated with seats C1 to C7 (see FIG. 2) described later on a one-to-one basis. The viewers V1 to V7 hold terminal apparatuses 40-1 to 40-7, respectively. Therefore, FIG. 1 illustrates the terminal apparatuses 40-1 to 40-7 as an example of the terminal apparatuses 40-1 to 40-n connected to the image transmission apparatus 30A. That is, the present embodiment describes a case in which n=7. Hereinafter, when a freely selected one of the terminal apparatuses 40-1 to 40-7 is to be described, the terminal apparatus is represented by a "terminal apparatus 40-i" (i is any integer from 1 to 7). When a freely selected one of the viewers V1 to V7 is to be described, the viewer is represented by a "viewer Vi" (i is any integer from 1 to 7).

The image transmission system 1 is a system for transmitting images (a first image PC1 and a second image PC2 described later) captured by the first image capture apparatus 10 and the second image capture apparatus 20 to the terminal apparatuses 40-1 to 40-7. More specifically, the first image capture apparatus 10 and the second image capture apparatus 20 capture images of a performer P (see FIG. 2) performing a singing performance or the like. Using a terminal apparatus 40-I, a viewer Vi views images of the performer P performing the performance. That is, the image transmission system 1 is used to transmit an online live show.

In the present embodiment, a case in which the online live show is a so-called real-time distribution that transmits images of a performance in real-time is considered. The online live show is not limited thereto and may use a method of transmitting previously-recorded images of a performance later.

A terminal apparatus 40-i is, for example, an information processor such as a smartphone, a tablet terminal, a personal computer, smart glasses, or virtual reality (VR) glasses. A terminal apparatus 40-i includes, for example, an image display apparatus such as a display, a speaker, and a communication apparatus that connects to the communication network N.

The first image capture apparatus 10 has an imaging optical system and an imaging element. The imaging optical system is an optical system including at least one imaging lens. For example, the imaging optical system may have various optical elements such as a prism, or may have a lens such as a zoom lens or a focus lens. The imaging element is, for example, a CCD (Charge Coupled Device) image sensor or a CMOS (Complementary MOS) image sensor.

The first image capture apparatus 10 includes an interface for outputting image data to the image transmission apparatus 30A. The first image capture apparatus 10 and the image transmission apparatus 30A may be connected to each other in a wired manner, or may be wirelessly connected to each other. The second image capture apparatus 20 has substantially the same configuration as that of the first image capture apparatus 10. The first image capture apparatus 10 and the second image capture apparatus 20 are video cameras, for example.

An image captured by the first image capture apparatus 10 is referred to as the "first image PC1" and image data corresponding to the first image PC1 is referred to as "first image data." An image captured by the second image capture apparatus 20 is referred to as the "second image PC2" and image data corresponding to the second image PC2 is referred to as "second image data." In the present embodiment, the first image capture apparatus 10 and the second image capture apparatus 20 capture moving images. The first image capture apparatus 10 captures an image at a predetermined frame rate, generates the first image data corresponding to the first image PC1, and outputs the generated first image data to the image transmission apparatus 30A. The second image capture apparatus 20 similarly generates the second image data corresponding to the second image PC2 and outputs the generated second image data to the image transmission apparatus 30A.

FIG. 2 is an explanatory diagram schematically illustrating an arrangement of the first image capture apparatus 10 and the second image capture apparatus 20. FIG. 2 is a view of a theater G seen from above. The space in the theater G is an example of a real space. The first image capture apparatus 10 and the second image capture apparatus 20 capture images of a performer P in the theater G. In the present embodiment, the performer P provides a live performance of singing or the like on a stage S installed in the theater G. The performance is not limited to singing and may be, for example, a play or a dance. In the present embodiment, the space in the theater G is relatively small and a direction L of line of sight of the performer P can be recognized from each of seats C1 to C7.

Virtual seats C1 to C7 are arranged in the theater G. When, for example, the seat C1 is a first seat and the seat C2 is a second seat, the seat C2 is arranged at a physical position different from that of the seat C1 in the theater G. Hereinafter, when a freely selected one of the seats C1 to C7 is to be described, the seat is represented by a seat Ci (i is any integer from 1 to 7). The seats C1 to C7 are, for example, divided zones of the floor of the theater G, each assigned with identification information (a seat number). The seats C1 to C7 may be chairs actually installed in the theater G. The viewers V1 to V7 are associated with the seats C1 to C7, respectively. For example, the viewer V1 is associated with the seat C1. That is, a viewer Vi is associated with a seat Ci. A terminal apparatus 40-i held by a viewer Vi is sometimes referred to as a "terminal apparatus 40-i associated with a seat Ci."

A seat Ci is allocated to a viewer Vi at a time of application to viewing of an online live show (or after the application and before the start of the live show). A viewer Vi may determine which one of the seats C1 to C7 to be allocated thereto, or a seat to be allocated thereto may be determined by lot or by other methods. When a fee is required for viewing of an online live show, the fee may vary depending on the positions of the seats C1 to C7. For example, a seat Ci closer to the center of the stage S may be more expensive. Multiple viewers Vi-1, Vi-2, . . . may be associated with one seat Ci. In the present embodiment, the same seat Ci is not allocated to all viewers V1 to Vj (j is any integer) viewing an online live show. If the same seat Ci is allocated to all the viewers V1 to Vj, all the viewers V1 to Vj view the same image and this is equivalent to a situation in which allocation of a seat Ci is notsubstantively performed.

The first image capture apparatus 10 captures the first image PC1 of the performer P performing in the theater G from the position of a seat Ci virtually arranged in the theater G. In the first embodiment, the first image capture apparatus 10 can move between the seats C1 and C7. The first image capture apparatus 10 captures an image of the performer P from the position of any of the seats C1 to C7 as the first image PC1. For example, when the first image capture apparatus 10 is at the position of the seat C1, an image of the performer P is captured from the position of the seat C1 as the first image PC1. When the first image capture apparatus 10 is at the position of the seat C2, an image of the performer P is captured from the position of the seat C2 as the first image PC1.

The first image capture apparatus 10 is mounted to the movement mechanism 50. The movement mechanism 50 moves the first image capture apparatus 10 between the seats C1 and C7. The movement mechanism 50 moves the first image capture apparatus 10 on the basis of control of a movement controller 314, which will be described later. The movement mechanism 50 includes a rail 52, a body 54, and an arm 56. The rail 52 is installed along an array of the seats C1 to C7. The body 54 houses members such as a drive wheel that moves on the rail 52, and an actuator that rotates the drive wheel. The arm 56 has one end fixed to the body 54, and the other end fixed to the first image capture apparatus 10. The body 54 moves on the rail 52, so that the first image capture apparatus 10 moves right and left in the theater G. The arm 56 is connected to an actuator (not illustrated) and can extend and contract vertically. Accordingly, the first image capture apparatus 10 can also move vertically in the theater G.

A person in charge of capturing images may move the first image capture apparatus 10, instead of moving the first image capture apparatus 10 with the movement mechanism 50.

Figure 3A:
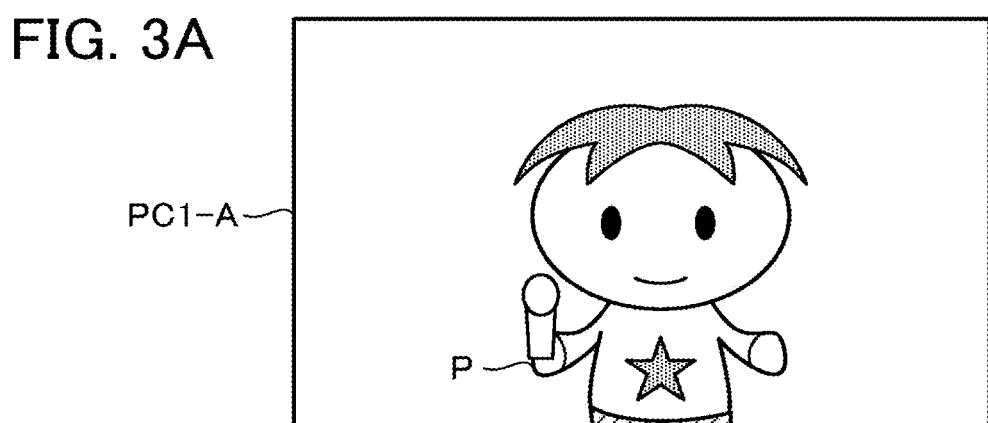
FIG. 3A is an explanatory diagram schematically illustrating a first image PC1.
Figure 3B:
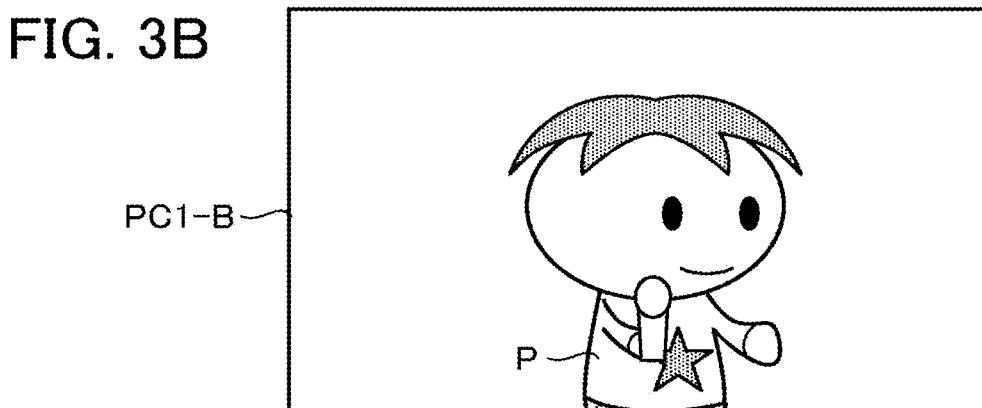
FIG. 3B is an explanatory diagram schematically illustrating the first image PC1.

FIGS. 3A and 3B are explanatory diagrams schematically illustrating the first image PC1. In the present embodiment, the imaging magnification of the first image capture apparatus 10 is set to principally cause the face of the performer P to largely occupy an image. By viewing the first image PC1, a viewer Vi can recognize expressions of the performer P, a direction L of the performer's line of sight (see FIG. 2), and the like.

FIG. 3A illustrates a first image PC1-A captured from the position of the seat C4 when the direction L of the line of sight of the performer P is toward the seat C4 as illustrated in FIG. 2. Since the performer P is looking toward the first image capture apparatus 10 (the seat C4) in the case of the first image PC1-A, the performer P appears to a viewer Vi of the first image PC1-A as looking toward the viewer Vi.

FIG. 3B illustrates a first image PC1-B captured from the position of the seat C1 when the direction L of the line of sight of the performer P is toward the seat C4, as illustrated in FIG. 2. Since the performer P is not looking toward the first image capture apparatus 10 in the case of the first image PC1-B, the performer P does not appear to a viewer Vi of the first image PC1-B as looking toward the viewer Vi.

The second image capture apparatus 20 captures the second image PC2 including the performer P from a position different from that of the first image capture apparatus 10. In the present embodiment, the second image capture apparatus 20 captures images of the entire stage S from a position farther from the stage S than the first image capture apparatus 10. The second image capture apparatus 20 may be fixed at a position, or may be mounted to the movement mechanism 50 to be movable in the theater G similarly to the first image capture apparatus 10. A plurality of image capture apparatuses corresponding to the second image capture apparatus 20 may be installed in the theater G. For example, an image capture apparatus that captures an image of the stage S from the right side and an image capture apparatus that captures an image of the stage S from the left side may be installed as the second image capture apparatus 20, in addition to an image capture apparatus that captures an image of the stage S from the front, as illustrated in FIG. 2.

Figure 4:
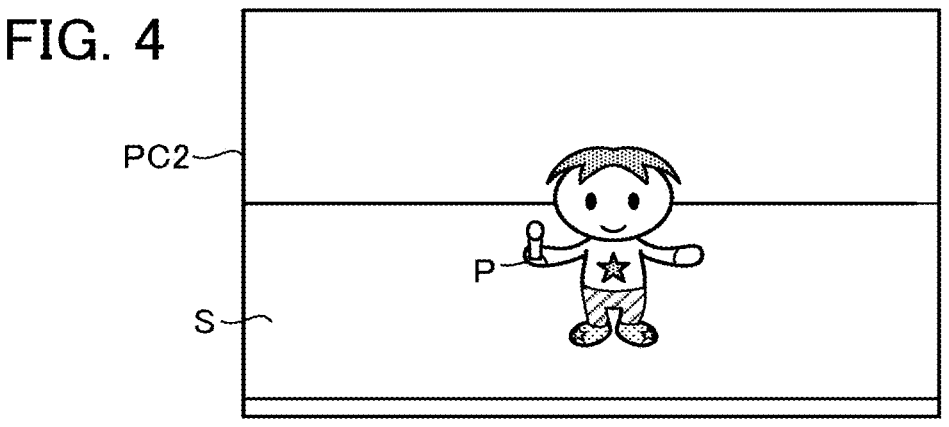
FIG. 4 is an explanatory diagram schematically illustrating a second image PC2.

FIG. 4 is an explanatory diagram schematically illustrating the second image PC2. A wide range of the stage S and the entire body of the performer P are included in the second image PC2 illustrated in FIG. 4. By viewing the second image PC2, a viewer Vi can recognize the motion of the body of the performer P, the production on the stage S, and the like.

As illustrated in FIGS. 3A, 3B, and 4, the proportion of the performer P occupying the first image PC1 is greater than the proportion of the performer P occupying the second image PC2. In other words, the imaging magnification of the first image PC1 is greater than that of the second image PC2.

A-2. Image Transmission Apparatus 30A

Figure 5:
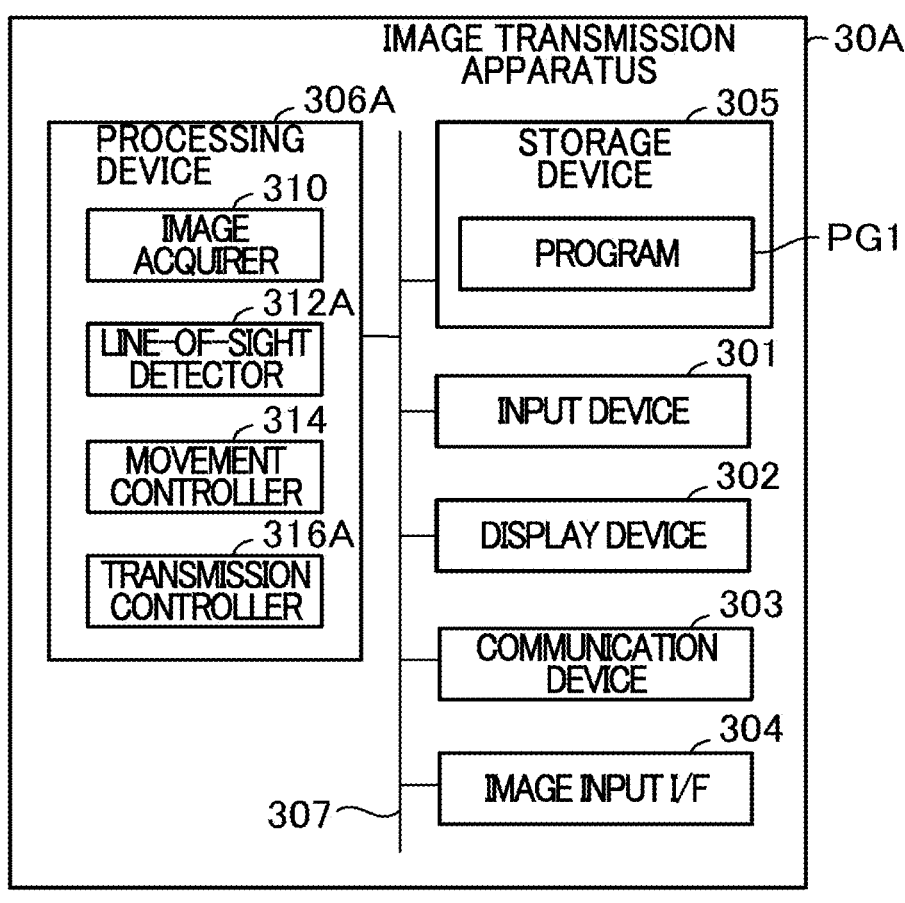
FIG. 5 is a block diagram illustrating a configuration of an image transmission apparatus 30A.

FIG. 5 is a block diagram illustrating a configuration of the image transmission apparatus 30A. The image transmission apparatus 30A is, for example, a computer and transmits the first image PC1 and the second image PC2 to the terminal apparatuses 40-1 to 40-7. The image transmission apparatus 30A includes an input device 301, a display device 302, a communication device 303, an image input interface (I/F) 304, a storage device 305, a processing device 306A, and a bus 307. The input device 301, the display device 302, the communication device 303, the image input interface 304, the storage device 305, and the processing device 306A are connected to each other via the bus 307 for communicating information. The bus 307 may comprise a single bus or multiple buses, which can vary depending on a device to be connected.

The input device 301 is a device that receives an operation from an administrator of the image transmission apparatus 30A. For example, the input device 301 includes a keyboard, a touchpad, a touchscreen, or a pointing device such as a mouse. In a case in which the input device 301 includes a touchscreen, the input device 301 may also function as the display device 302.

The display device 302 is a device that displays images and text information. The display device 302 displays various images under control of the processing device 306A. For example, various display panels such as a liquid crystal display panel and an organic electroluminescent (EL) display panel are suitably used as the display device 302.

The communication device 303 communicates with the terminal apparatuses 40-1 to 40-7 using wireless communication or wired communication. In the present embodiment, the communication device 303 includes an interface that is connectable to the communication network N, and communicates with the terminal apparatuses 40-1 to 40-7 via the communication network N.

The image input interface 304 is a connection interface to the first image capture apparatus 10 and the second image capture apparatus 20. The first image data and the second image data are input to the image transmission apparatus 30A via the image input interface 304.

The storage device 305 is a recording medium that is readable by the processing device 306A. The storage device 305 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory). The storage device 305 has a program PG1 stored therein. The program PG1 is a program for causing the image transmission apparatus 30A to operate.

The processing device 306A includes one or more CPUs (Central Processing Units). One or more CPUs are examples of one or more processors. Each of the processors and the CPUs is an example of a computer.

The processing device 306A reads the program PG1 from the storage device 305. The processing device 306A executes the program PG1 to function as an image acquirer 310, a line-of-sight detector 312A, a movement controller 314, and a transmission controller 316A. At least one of the image acquirer 310, the line-of-sight detector 312A, the movement controller 314, and the transmission controller 316A may be constituted of a circuit such as a DSP (Digital Signal Processor), an ASIC (Application Specific Integrated Circuit), a PLD (Programmable Logic Device), or an FPGA (Field Programmable Gate Array).

The image acquirer 310 acquires the first image PC1 from the first image capture apparatus 10. The image acquirer 310 also acquires the second image PC2 from the second image capture apparatus 20. The image acquirer 310 is an example of a first acquirer and a second acquirer. The image acquirer 310 continuously acquires the first image PC1 and the second image PC2 during a performance of the performer P.

The line-of-sight detector 312A detects the direction L of the line of sight of the performer P. The line-of-sight detector 312A is an example of a detector. In the first embodiment, the line-of-sight detector 312A detects the direction L of the line of sight of the performer P on the basis of the second image PC2. The line-of-sight detector 312A performs an image analysis of the second image PC2 to detect the position of the performer P on the stage S and the direction of the face of the performer P. The line-of-sight detector 312A assumes, for example, that the performer P's line of sight is directed in a direction that the face of the performer P is facing. The line-of-sight detector 312A may further detect the position of a pupil of the performer P from the second image PC2 to detect the direction L of the line of sight of the performer P in more detail.

The movement controller 314 controls the movement mechanism 50. The movement controller 314 drives the movement mechanism 50 to move the first image capture apparatus 10 to the intersection between the rail 52 and the direction L of the line of sight of the performer P detected by the line-of-sight detector 312A. That is, the movement controller 314 causes the movement mechanism 50 to move the first image capture apparatus 10 between the seats C1 and C7 on the basis of the direction L of the line of sight of the performer P detected by the line-of-sight detector 312A.

For example, when the direction L of the line of sight of the performer P is toward the seat C4 as in FIG. 2, the movement controller 314 moves the first image capture apparatus 10 to the position of the seat C4. For example, when the direction L of the line of sight of the performer P is toward the seat C1, the movement controller 314 moves the first image capture apparatus 10 to the position of the seat C1. In the first embodiment, since the first image capture apparatus 10 is moved in the direction L of the line of sight of the performer P, the resulting first image PC1 predominantly shows an image in which the performer P's line of sight is toward the seat C1, as illustrated in FIG. 3A.

For example, depending on the choreography in singing, there are cases in which the direction L of the line of sight of the performer P is toward an area to which the movement mechanism 50 cannot move, such as a case in which the performer P turns the back to the seats C1 to C7 or a case in which the performer P looks skywards. In such a case, the movement controller 314 may cause the first image capture apparatus 10 to move to a predetermined reference position (for example, a central position of the rail 52) and wait there, or may keep the first image capture apparatus 10 at a position where the first image capture apparatus 10 has failed in following the direction L of the line of sight.

The transmission controller 316A transmits a captured image of the performer P to each of the terminal apparatuses 40-1 to 40-7. The captured image of the performer P is the first image PC1 or the second image PC2. The transmission controller 316A switches the image to be transmitted to each of the terminal apparatuses 40-1 to 40-7 between the first image PC1 and the second image PC2 on the basis of the direction L of the line of sight of the performer P. The images transmitted to the terminal apparatuses 40-1 to 40-7 differ for each of the terminal apparatuses 40-1 to 40-7.

More specifically, the transmission controller 316A transmits the second image PC2 to the terminal apparatuses 40-1 to 40-7 in normal times. For example, as for the terminal apparatus 40-1, the normal times are times when the direction L of the line of sight of the performer P is not toward the seat C1 associated with the terminal apparatus 40-1. The transmission controller 316A transmits the first image PC1 to a terminal apparatus **40-*i* held by a viewer Vi when the direction L of the line of sight of the performer P is toward a seat Ci associated with the viewer Vi holding the terminal apparatus 40-*i*. That is, the transmission controller 316A transmits the first image PC1 to a terminal apparatus 40-*i*** on the basis of turning of the direction L of the line of sight of the performer P on a seat Ci.

Figure 6:
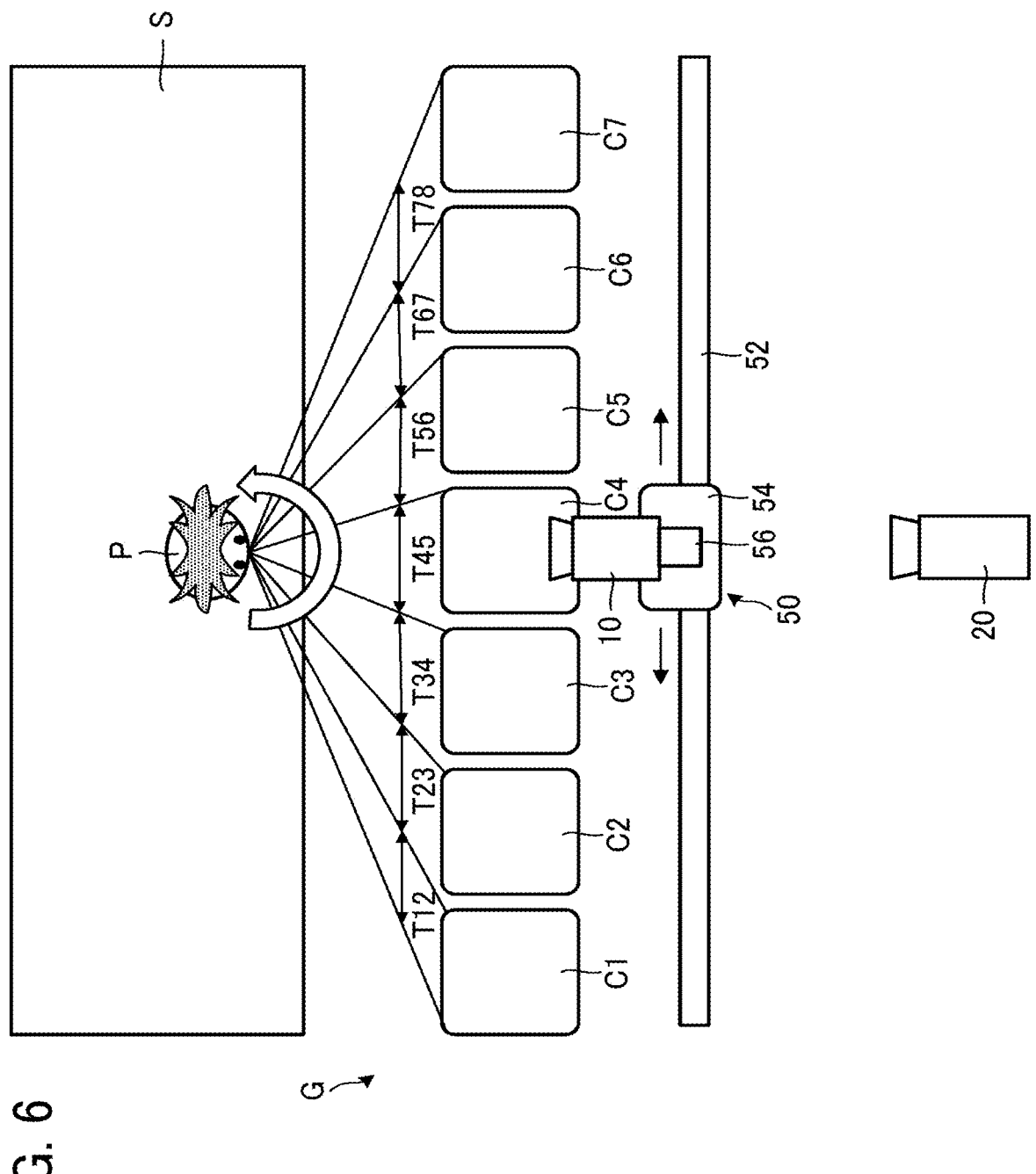
FIG. 6 is an explanatory diagram schematically illustrating a direction L of line of sight of a performer.

FIG. 6 is an explanatory diagram schematically illustrating the direction L of the line of sight of the performer P. In FIG. 6, a time period Tjk (j and k are integers, k=j+1) indicates a time period from a time tj to a time tk. For example, a case in which the performer P turns the line of sight sequentially from the seat C1 to the seat C7 is considered. A time period in which the line of sight is on the seat C1 is a time period T12, a time period in which the line of sight is on the seat C2 is a time period T23, a time period in which the line of sight is on the seat C3 is a time period T34, a time period in which the line of sight is on the seat C4 is a time period T45, a time period in which the line of sight is on the seat C5 is a time period T56, a time period in which the line of sight is on the seat C6 is a time period T67, and a time period in which the line of sight is on the seat C7 is a time period T78.

Figure 7:
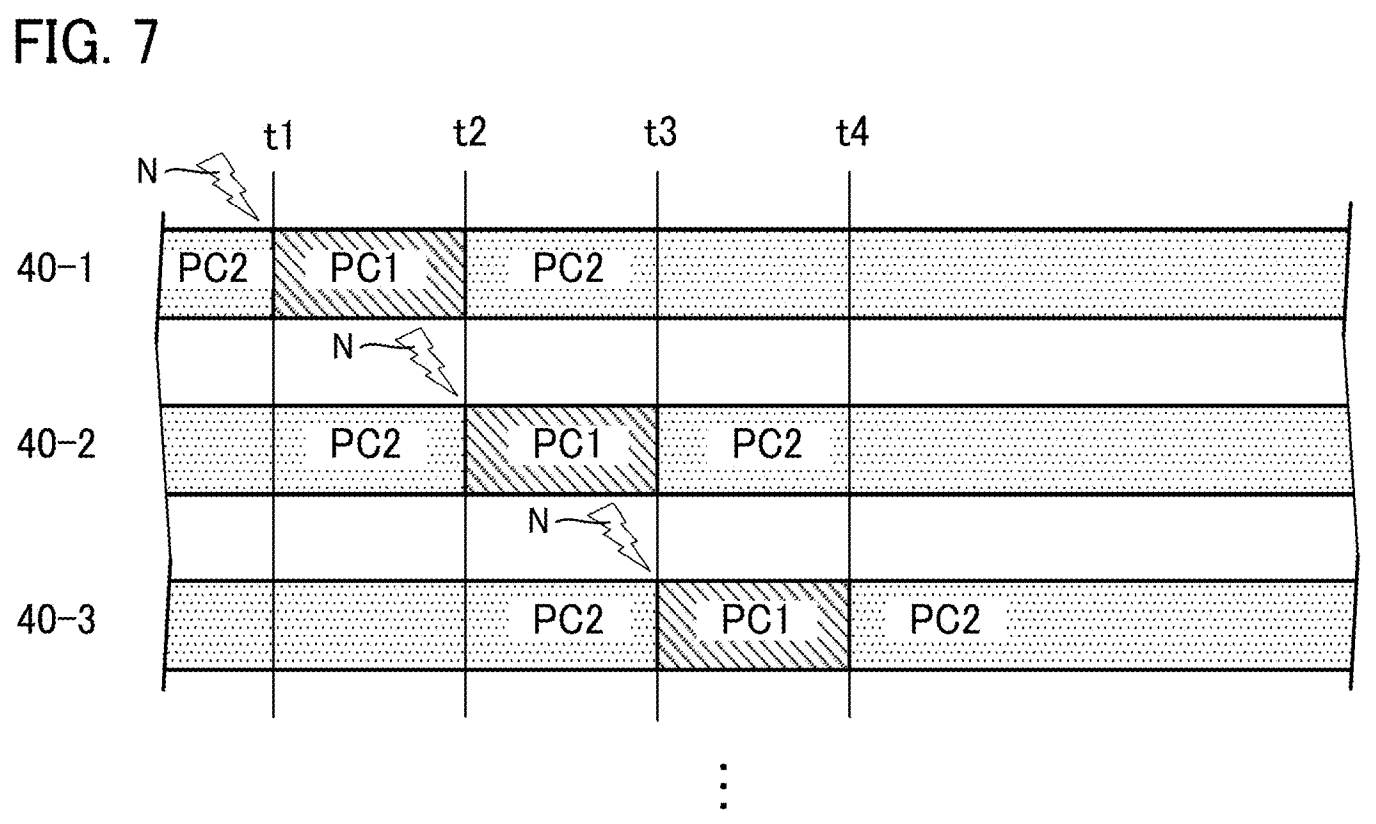

FIG. 7 is an explanatory diagram schematically illustrating a switching timing of a transmission image corresponding to the direction L of the line of sight illustrated in FIG. 6. For example, to the terminal apparatus 40-1 held by the viewer V1 corresponding to the seat C1, the second image PC2 is transmitted until a time t1. The first image PC1 is transmitted from the time t1 to a time t2 when the performer P is directing the line of sight to the seat C1. The second image PC2 is transmitted after the time t2 when the line of sight of the performer P is turned away from the seat C1.

For example, to the terminal apparatus 40-2 held by the viewer V2 corresponding to the seat C2, the second image PC2 is transmitted until the time t2. From the time t2 to a time t3 when the performer P directs the line of sight to the seat C2, the first image PC1 is transmitted. After the time t3 when the line of sight of the performer P is turned away from the seat C2, the second image PC2 is transmitted. To other terminal apparatuses 40-3 to 40-7, the first image PC1 is similarly transmitted while the performer P directs the line of sight to the seats C3 to C7.

In the explanations described above, a case in which the transmission controller 316A switches the image to be transmitted to a terminal apparatus 40-i between the first image PC1 and the second image PC2 has been considered. That is, the image transmitted to a terminal apparatus 40-i at a certain time point is either the first image PC1 or the second image PC2. However, the present embodiment is not limited thereto. For example, the transmission controller 316A may always transmit the first image PC1 and the second image PC2 to a terminal apparatus 40-i and transmit a control signal for switching the image to be displayed on the terminal apparatus 40-i between the first image PC1 and the second image PC2.

There is a possibility that a viewer Vi will not look at the screen when the image displayed on a terminal apparatus 40-i is switched to the first image PC1, or there is a possibility that a viewer Vi will view images in a desultory manner without noticing switching of the images. Therefore, the transmission controller 316A may transmit an alert to a terminal apparatus 40-i before the image transmitted to the terminal apparatus 40-i is switched from the second image PC2 to the first image PC1. More specifically, the transmission controller 316A may transmit an alert to a terminal apparatus 40-i substantially at the same time as a time when the first image PC1 is transmitted to the terminal apparatus 40-i or before the first image PC1 is transmitted to the terminal apparatus 40-i.

One example of the transmission timings of an alert is indicated by reference signs N in FIG. 7. Transmitting an alert may be, for example, transmission of a control signal for actuating a vibration function of a terminal apparatus 40-i, or may be transmission of a control signal for causing the terminal apparatus 40-i to output an alert sound. Transmitting an alert may be transmission of a control signal for causing a terminal apparatus 40-i to display a video or an image indicating an alert. The control signal may be, for example, a signal transmitted to a terminal apparatus 40-i along with the first image PC1 and causing an alert to be generated immediately before output of the first image PC1 or at the same time as the output of the first image PC1. A viewer Vi having received an alert can recognize switching of the image to the first image PC1 and can avoid missing the first image PC1.

To transmit an alert in advance, the direction L of the line of sight of the performer P needs to be predicted beforehand. The line-of-sight detector 312A may continuously track the direction L of the line of sight of the performer P, analyze changes in the direction L of the line of sight, and estimate the direction L to which the line of sight of the performer P will be turned a predetermined time later. In this case, the transmission controller 316A transmits an alert to a terminal apparatus 40-i corresponding to a seat Ci on which the line of sight of the performer P will be turned at the predetermined time later.

A-3. Operation of Processing Device 306A

Figure 8:
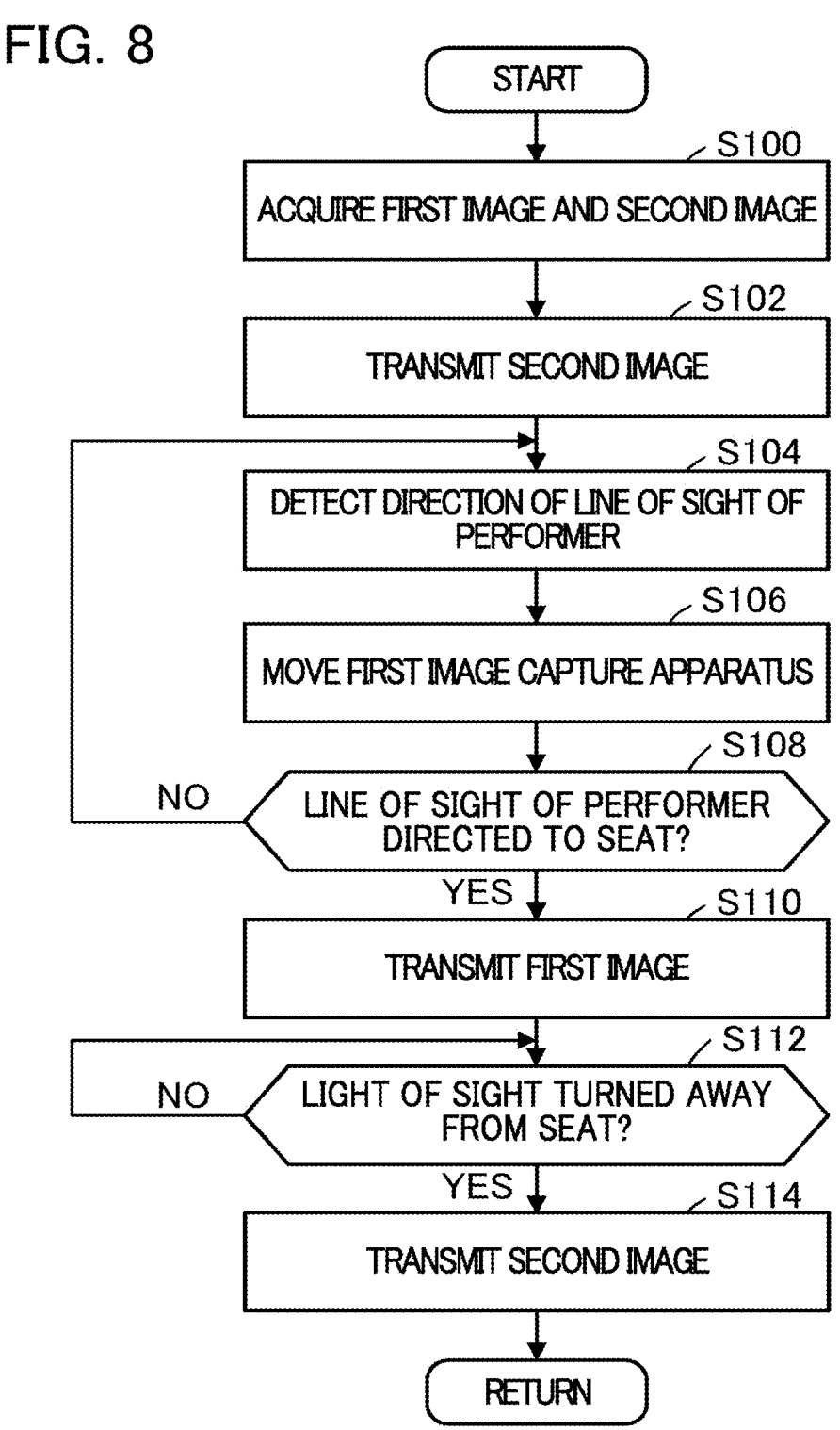
FIG. 8 is a flowchart illustrating an operation of a processing device 306A.

FIG. 8 is a flowchart illustrating an operation of the processing device 306A. In the flowchart of FIG. 8, image transmission processing for one terminal apparatus 40-i is illustrated for convenience of explanation. The processing device 306A performs processing described below in parallel to each of the terminal apparatuses 40-1 to 40-7.

The processing device 306A functions as the image acquirer 310 and acquires the first image PC1 from the first image capture apparatus 10 and the second image PC2 from the second image capture apparatus 20 (Step S100). The acquisition of the first image PC1 and the second image PC2 is continuously performed also during subsequent processing. The processing device 306A functions as the transmission controller 316A and transmits the second image PC2 to a terminal apparatus 40-i of a viewer Vi (Step S102).

The processing device 306A functions as the line-of-sight detector 312A and detects the direction L of the line of sight of the performer P on the basis of the second image PC2 (Step S104). The processing device 306A functions as the movement controller 314 and moves the first image capture apparatus 10 on an extension of the line of sight of the performer P (Step S106).

The processing device 306A functions as the transmission controller 316A and determines whether there is a seat Ci on the extension of the line of sight of the performer P, that is, whether the line of sight of the performer P is directed to the seat Ci (Step S108). When the line of sight of the performer P is not directed to the seat Ci (S108: NO), the processing device 306A returns the processing to Step S104.

When the line of sight of the performer P is directed to a seat Ci (Step S108: YES), the processing device 306A functions as the transmission controller 316A and transmits the first image PC1 to a terminal apparatus 40-i of a viewer Vi corresponding to the seat Ci (Step S110). At that time, the processing device 306A may transmit an alert to the terminal apparatus 40-i.

The processing device 306A waits until the line of sight of the performer P is turned away from the seat Ci (Step S112: NO). In the meantime, the first image PC1 is transmitted to the terminal apparatus 40-i. When the line of sight of the performer P is turned away from the seat Ci (Step S112: YES), the processing device 306A functions as the transmission controller 316A and transmits the second image PC2 to the terminal apparatus 40-i of the viewer Vi corresponding to the seat Ci (Step S114). Subsequently, the processing device 306A returns the processing to Step S100.

As described above, according to the image transmission system 1 of the first embodiment, when the line of sight of a performer P is turned on a virtually set seat Ci, the first image PC1 of the performer P captured from the seat Ci is transmitted to a viewer Vi. The viewer Vi can have an experience as expected in a real live show venue, such as having eye contact with the performer P in a live show venue, also in viewing of an online live show. Accordingly, the added value of the online live show is increased.

According to the image transmission system 1, a seat Ci is allocated to a viewer Vi viewing an online live show. Therefore, a viewer Vi can view the first image PC1 that cannot be viewed by other viewers Vi+n (n may be any integer) and can have an experience substantially the same as that obtained when actually going to a live show venue.

In the image transmission system 1, when the image transmitted to a terminal apparatus 40-i is switched from the second image PC2 to the first image PC1, an alert is transmitted to the terminal apparatus 40-i. Accordingly, the probability that a viewer Vi will miss the first image PC1 is decreased and the level of satisfaction with an online live show is further enhanced.

In the first embodiment, one first image capture apparatus 10 moves between the seats C1 and C7 to capture the first image PC1. Accordingly, the system cost of the image transmission system 1 is reduced as compared to a case in which a plurality of image capture apparatuses is arranged.

In the first embodiment, the direction L of the line of sight of a performer P is detected based on the second image PC2 captured by the second image capture apparatus 20. Accordingly, the system cost of the image transmission system 1 is reduced as compared to a case in which an image capture apparatus for tracking the line of sight of the performer P is separately arranged.

B. Second Embodiment

A second embodiment of the present invention is explained below. In the following explanations, elements identical to those in the first embodiment are denoted by like reference signs and explanations of functions thereof are omitted as appropriate. In the following explanations, differences between the second embodiment and the first embodiment are mainly explained for simplicity.

B-1. System Configuration

Figure 9:
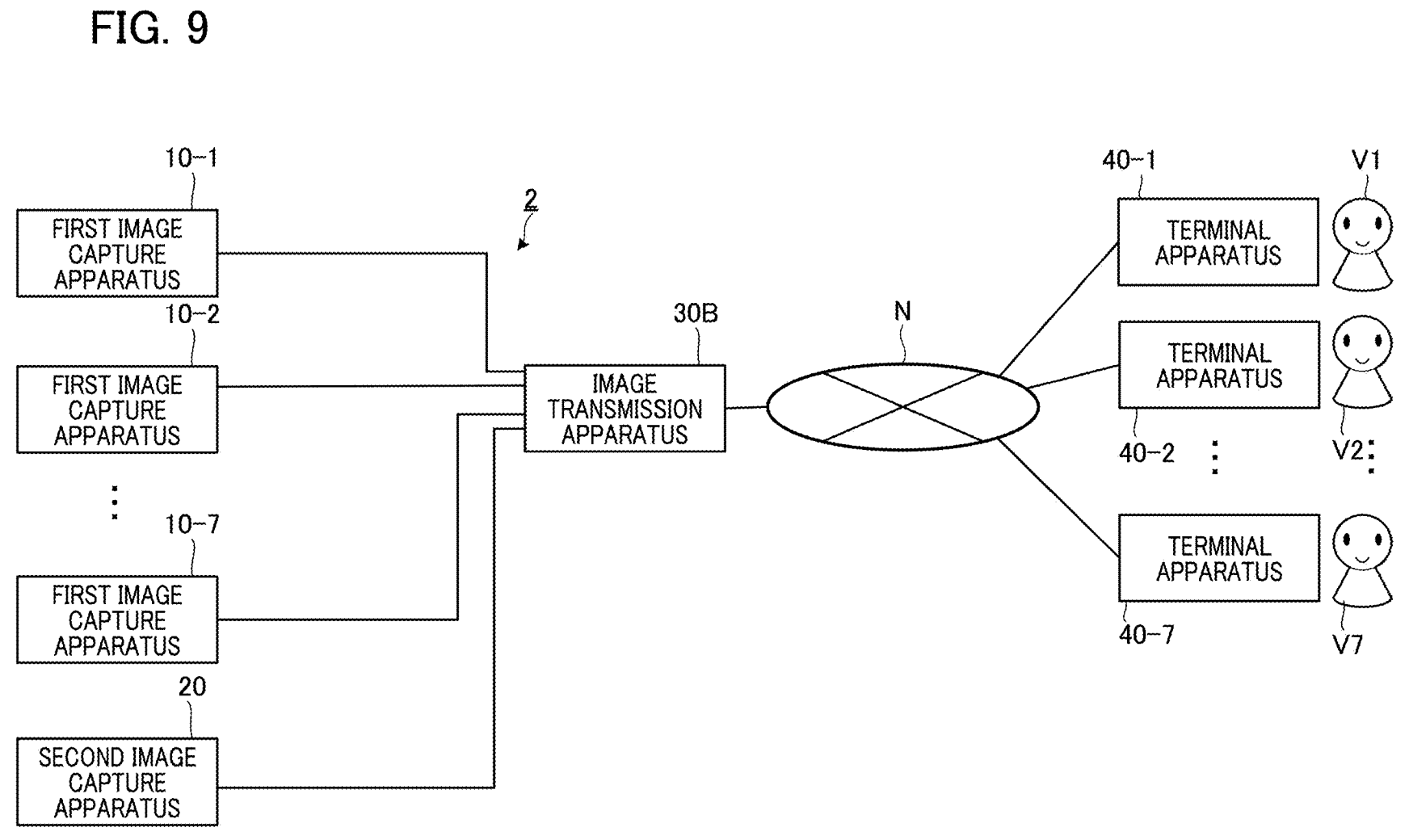

FIG. 9 is a block diagram illustrating a configuration of an image transmission system 2 according to a second embodiment. The image transmission system 2 includes a plurality of first image capture apparatuses 10-1 to 10-7, the second image capture apparatus 20, and an image transmission apparatus 30B. Hereinafter, when a freely selected one of the first image capture apparatuses 10-1 to 10-7 is to be described, the first image capture apparatus is represented by a first image capture apparatus 10-i (i is any integer from 1 to 7). The image transmission apparatus 30B is connected to terminal apparatuses 40 (40-1, 40-2, . . . , 40-7) via the communication network N. The second image capture apparatus 20 and the terminal apparatuses 40-1 to 40-7 in the second embodiment are substantially the same as those in the first embodiment, and therefore explanations thereof are omitted.

Figure 10:
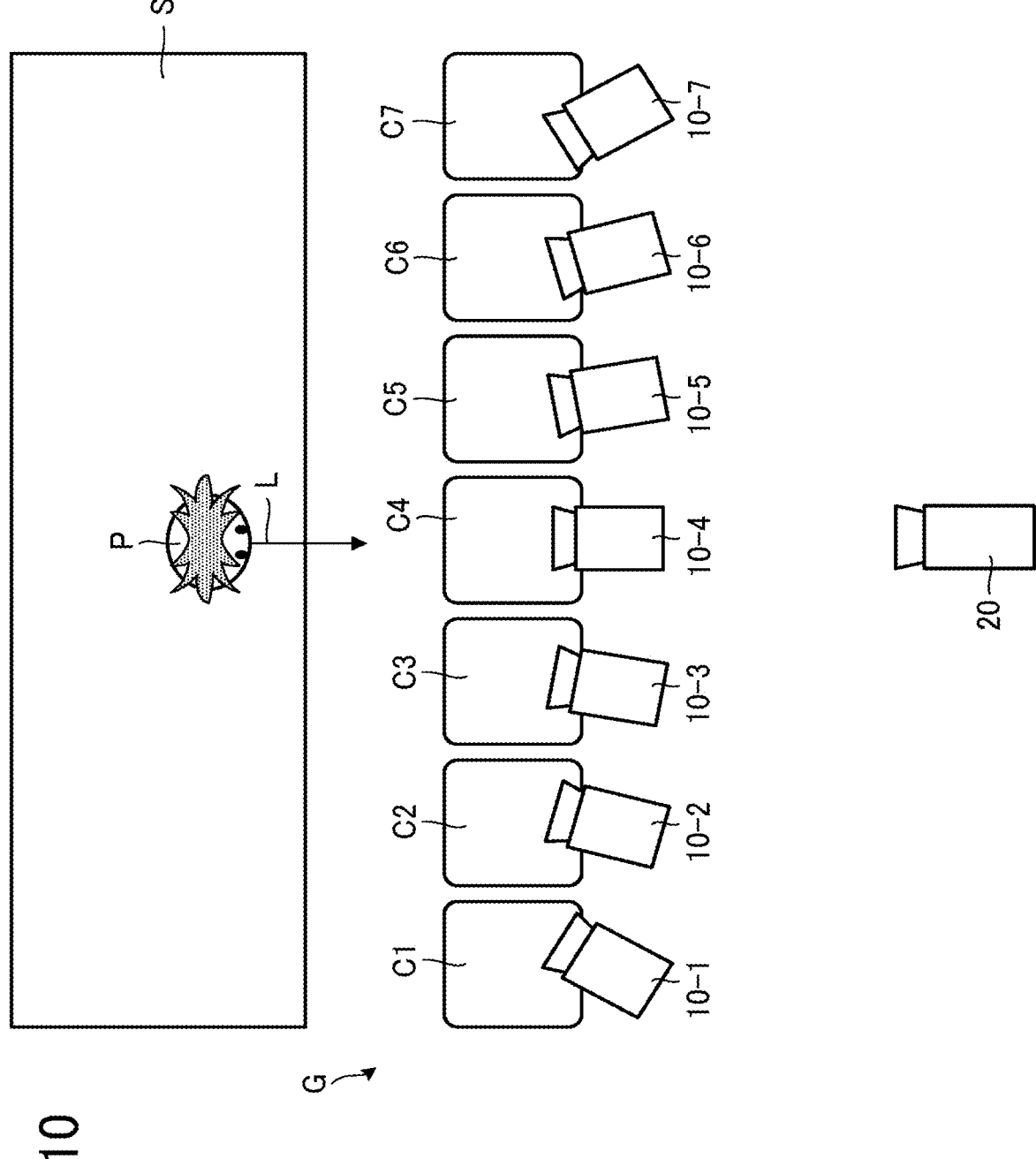
FIG. 10 is an explanatory diagram schematically illustrating an arrangement of first image capture apparatuses 10-1 to 10-7 in the second embodiment.

FIG. 10 is an explanatory diagram schematically illustrating an arrangement of the first image capture apparatuses 10-1 to 10-7 in the second embodiment. FIG. 10 is a view of the theater G seen from above. The first image capture apparatuses 10-1 to 10-7 are installed at the positions of the seats C1 to C7 in the theater G, respectively. The first image capture apparatuses 10-1 to 10-7 are fixed at the positions of the seats C1 to C7, respectively. For example, the first image capture apparatus 10-1 is fixed at the position of the seat C1 and the first image capture apparatus 10-2 is fixed at the position of the seat C2. "Being fixed" indicates not being moved in the theater G toward other seats Ci. For example, a first image capture apparatus 10-i may be capable of performing swiveling such as panning or tilting, upward and downward movement, and the like.

A first image capture apparatus 10-i captures an image of the stage S seen from a seat Ci as a first image PC1-i. The imaging range of the first image capture apparatus 10-i may be set, for example, to enable the entire stage S to be included, or may be set to enable the face of the performer P to be included close-up. In a case in which the imaging range is set to enable the face of the performer P to be included close-up, it is preferable that the first image capture apparatus 10-i be provided with an auxiliary mechanism for performing, for example, panning, tilting, or zooming by a remote operation.

B-2. Image Transmission Apparatus 30B

Figure 11:
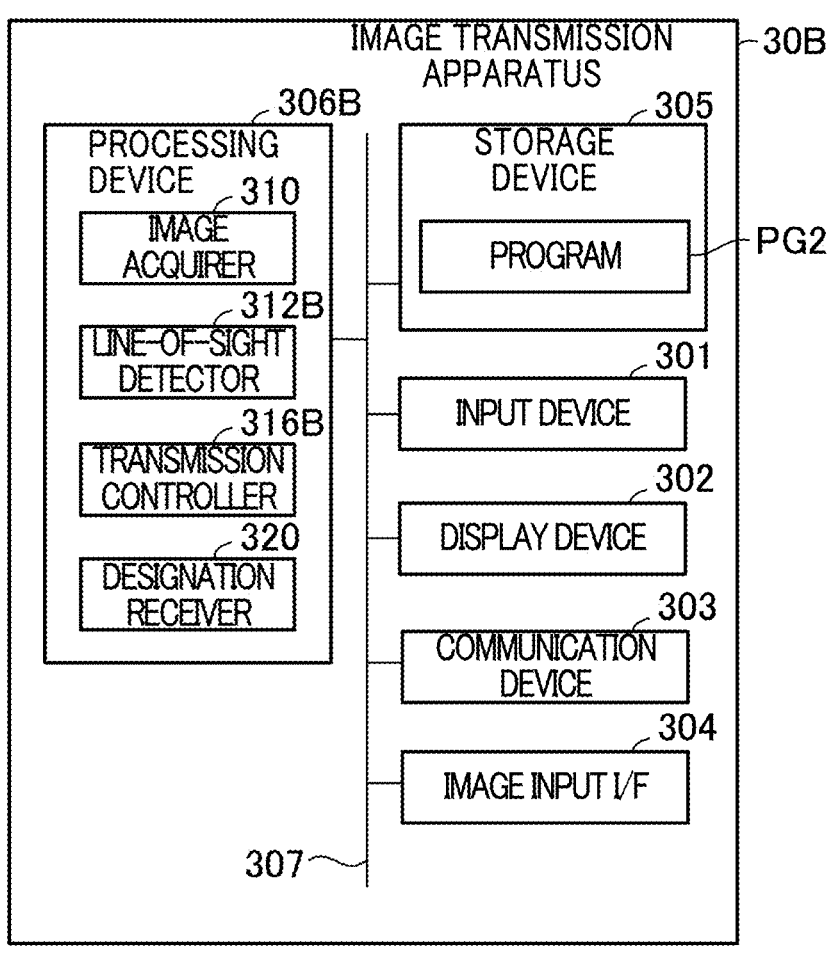
FIG. 11 is a block diagram illustrating a configuration of an image transmission apparatus 30B.

FIG. 11 is a block diagram illustrating a configuration of the image transmission apparatus 30B. The image transmission apparatus 30B includes the input device 301, the display device 302, the communication device 303, the image input interface 304, the storage device 305, a processing device 306B, and the bus 307. The input device 301, the display device 302, the communication device 303, the image input interface 304, and the bus 307 in the second embodiment are substantially the same as those in the first embodiment, and therefore explanations thereof are omitted.

The storage device 305 has a program PG2 stored therein. The program PG2 is a program for causing the image transmission apparatus 30B to operate.

The processing device 306B executes the program PG2 to function as the image acquirer 310, a line-of-sight detector 312B, a transmission controller 316B, and a designation receiver 320. At least one of the image acquirer 310, the line-of-sight detector 312B, the transmission controller 316B, and the designation receiver 320 may be constituted of a circuit such as a DSP, an ASIC, a PLD, and an FPGA.

The image acquirer 310 functions similarly to that in the first embodiment.

The designation receiver 320 receives a designation from a viewer Vi as to which one of the first image PC1 and the second image PC2 is the image to be transmitted to a terminal apparatus 40-i. In the first embodiment, one first image capture apparatus 10 moves between the seats C1 and C7. In contrast thereto, in the second embodiment, the first image capture apparatuses 10-1 to 10-7 are installed on the seats C1 to C7, respectively, and an image of the stage S seen from any seat Ci can always be acquired. Reception of a designation of the image to be transmitted to a terminal apparatus 40-i enables a viewer Vi to enjoy a performance from a seat Ci corresponding thereto.

Figure 12A:
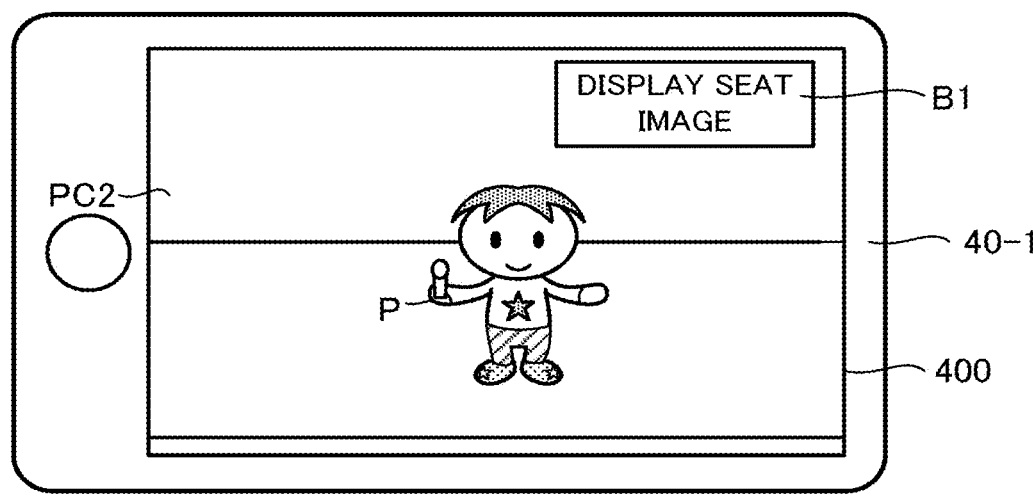
FIG. 12A is an explanatory diagram illustrating one example of a viewing screen of an online live show on a terminal apparatus 40-1.
Figure 12B:
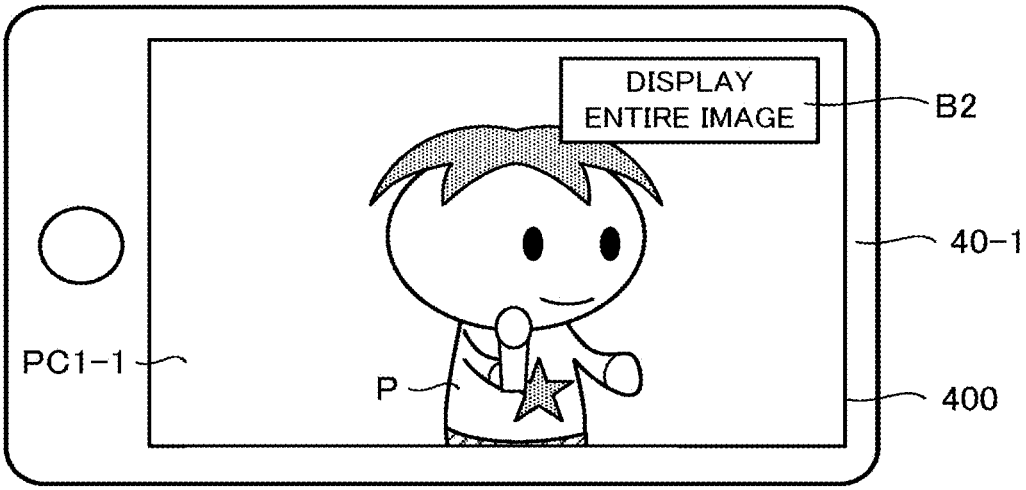
FIG. 12B is an explanatory diagram illustrating one example of a viewing screen of an online live show on the terminal apparatus 40-1.

FIGS. 12A and 12B are explanatory diagrams illustrating one example of a viewing screen of an online live show on the terminal apparatus 40-1. FIGS. 12A and 12B describe the terminal apparatus 40-1 associated with the seat C1 as one example of a terminal apparatus 40-i. The terminal apparatus 40-1 is, for example, a smartphone. For example, a case in which the performer P is looking toward the seat C4 as illustrated in FIG. 10 is considered.

When the second image PC2 is being viewed on the terminal apparatus 40-1, an image that is captured from the front of the stage S, with the entire body of the performer P included, is displayed on a display 400 of the terminal apparatus 40-1 as illustrated in FIG. 12A. A first button B1 for image switching is displayed on the display 400. The first button B1 is a button for display switching to a first image PC1-1 captured by the first image capture apparatus 10-1 that is installed on the seat C1 associated with the terminal apparatus 40-1.

When the viewer V1 presses the first button B1, the first image PC1-1 is displayed on the display 400 as illustrated in FIG. 12B. As the first image PC1-1, an image of the performer P directing the line of sight toward the seat C4, which is captured from the seat C1, is displayed. A second button B2 for image switching is displayed on the display 400. The second button B2 is a button for display switching to the second image PC2 captured by the second image capture apparatus 20. When the viewer V1 presses the second button B2, the second image PC2 as illustrated in FIG. 12A, is displayed on the display 400.

The line-of-sight detector 312B detects the direction L of the line of sight of the performer P. The line-of-sight detector 312B is one example of a detector. In the second embodiment, the line-of-sight detector 312B detects the direction L of the line of sight of the performer P on the basis of the first image PC1. The line-of-sight detector 312B detects the position of the performer P on the stage S and the direction of the face of the performer P by a method of performing an image analysis on each of the first images PC1-1 to PC1-7. The line-of-sight detector 31 supposes, for example, that the line of sight of the performer P is directed to a first image capture apparatus 10-$i$ capturing an image in which the performer P faces the front. The line-of-sight detector 312B may detect the position of a pupil of the performer P from the first images PC1-1 to PC1-7 to detect the direction L of the line of sight of the performer P in more detail.

Also in the second embodiment, the direction L of the line of sight of the performer P may be detected on the basis of the second image PC2 similarly to the first embodiment.

The transmission controller 316B transmits a captured image of the performer P to each of the terminal apparatuses 40-1 to 40-7. The captured image of the performer P is the first image PC1 or the second image PC2. The transmission controller 316B switches the image to be transmitted to each of the terminal apparatuses 40-1 to 40-7 between the first image PC1 and the second image PC2 on the basis of the result of a designation received by the designation receiver 320. That is, the images transmitted to the terminal apparatuses 40-1 to 40-7 differ for each of the terminal apparatuses 40-1 to 40-7.

The transmission controller 316B transmits one of the first image PC1 or the second image PC2 designated by a viewer Vi to a terminal apparatus 40-$i$ in normal times. The normal times are times when the direction L of the line of sight of the performer P is not toward a seat Ci associated with the terminal apparatus 40-$i$. On the other hand, when the direction L of the line of sight of the performer P is turned on the seat Ci corresponding to the terminal apparatus 40-$i$, the transmission controller 316B transmits a first image PC1-$i$ to the terminal apparatus 40-$i$ regardless of the designation provided by the viewer Vi.

Figure 13:
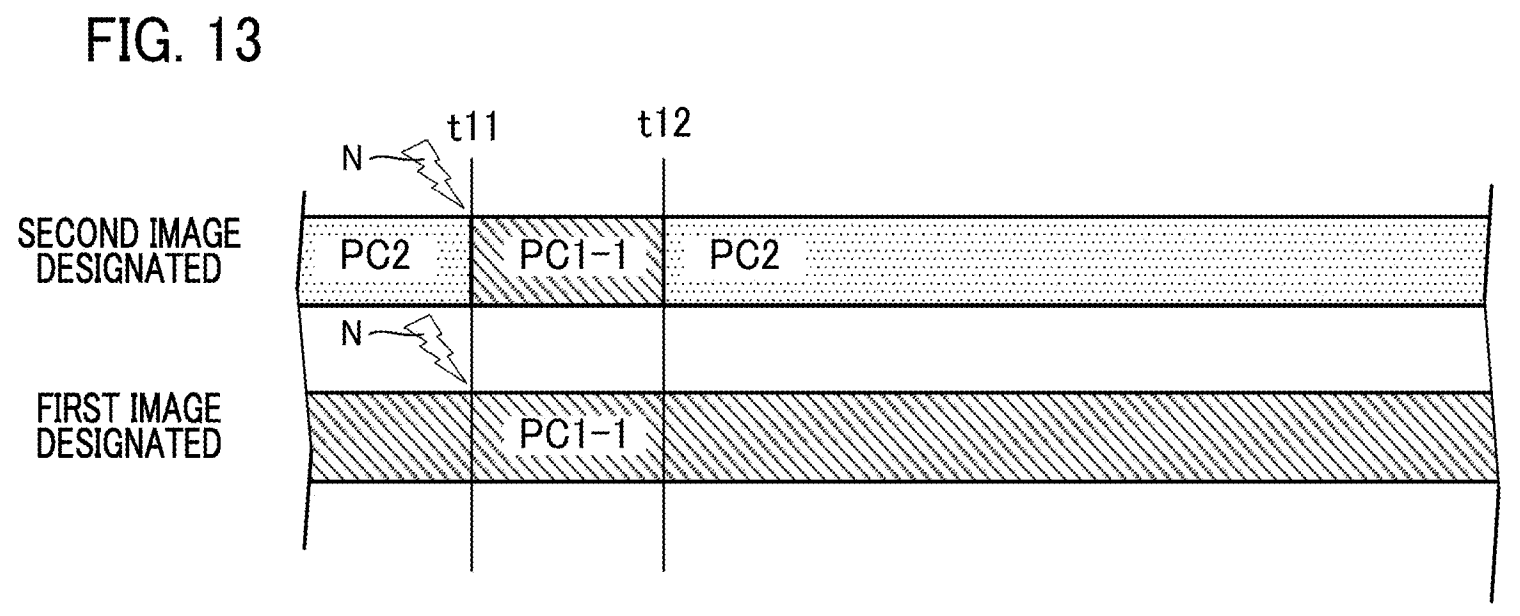

FIG. 13 is an explanatory diagram schematically illustrating switching of a transmission image performed by the transmission controller 316B. FIG. 13 illustrates, for example, images transmitted to the terminal apparatus 40-1. Hereinafter, a case in which the performer P directs the line of sight to the seat C1 associated with the terminal apparatus 40-1 from a time t11 to a time t12 is considered.

For example, "SECOND IMAGE DESIGNATED" in FIG. 13 indicates a case in which the viewer V1 designates the second image PC2 immediately before the time t11. The transmission controller 316B transmits the second image PC2 to the terminal apparatus 40-1 until the time t11. The transmission controller 316B transmits the first image PC1-1 to the terminal apparatus 40-1 during a period from the time t11 to the time t12 in which the line of sight of the performer P is directed to the seat C1. The transmission controller 316B may transmit an alert (reference sign N in FIG. 13) before the displayed image on the terminal apparatus 40-1 is switched to the first image PC1-1. The transmission controller 316B brings the image to be transmitted to the terminal apparatus 40-1 back to the second image PC2 after the time t12 when the line of sight of the performer P is turned away from the seat C1.

"FIRST IMAGE DESIGNATED" in FIG. 13 indicates a case in which the viewer V1 designates the first image PC1 immediately before the time t11. At the time t11, the transmission controller 316B is transmitting the first image PC1-1 to the terminal apparatus 40-1. The transmission controller 316B continues the transmission of the first image PC1-1 to the terminal apparatus 40-1 also during the period from the time t11 to the time t12 in which the line of sight of the performer P is directed to the seat C1. The transmission controller 316B transmits the first image PC1-1 to the terminal apparatus 40-1 also after the time t12 when the line of sight of the performer P is turned away from the seat C1. It is preferable that the transmission controller 316B transmit an alert (reference sign N in FIG. 13) to the terminal apparatus 40-1 before the time t11 when the line of sight of the performer P is turned to the seat C1. Accordingly, the viewer V1 can recognize the turning of the line of sight of the performer P to the seat C1 and can prevent an image in which the performer P is looking in the camera from being missed.

B-3. Operation of Processing Device 306B

Figure 14A:
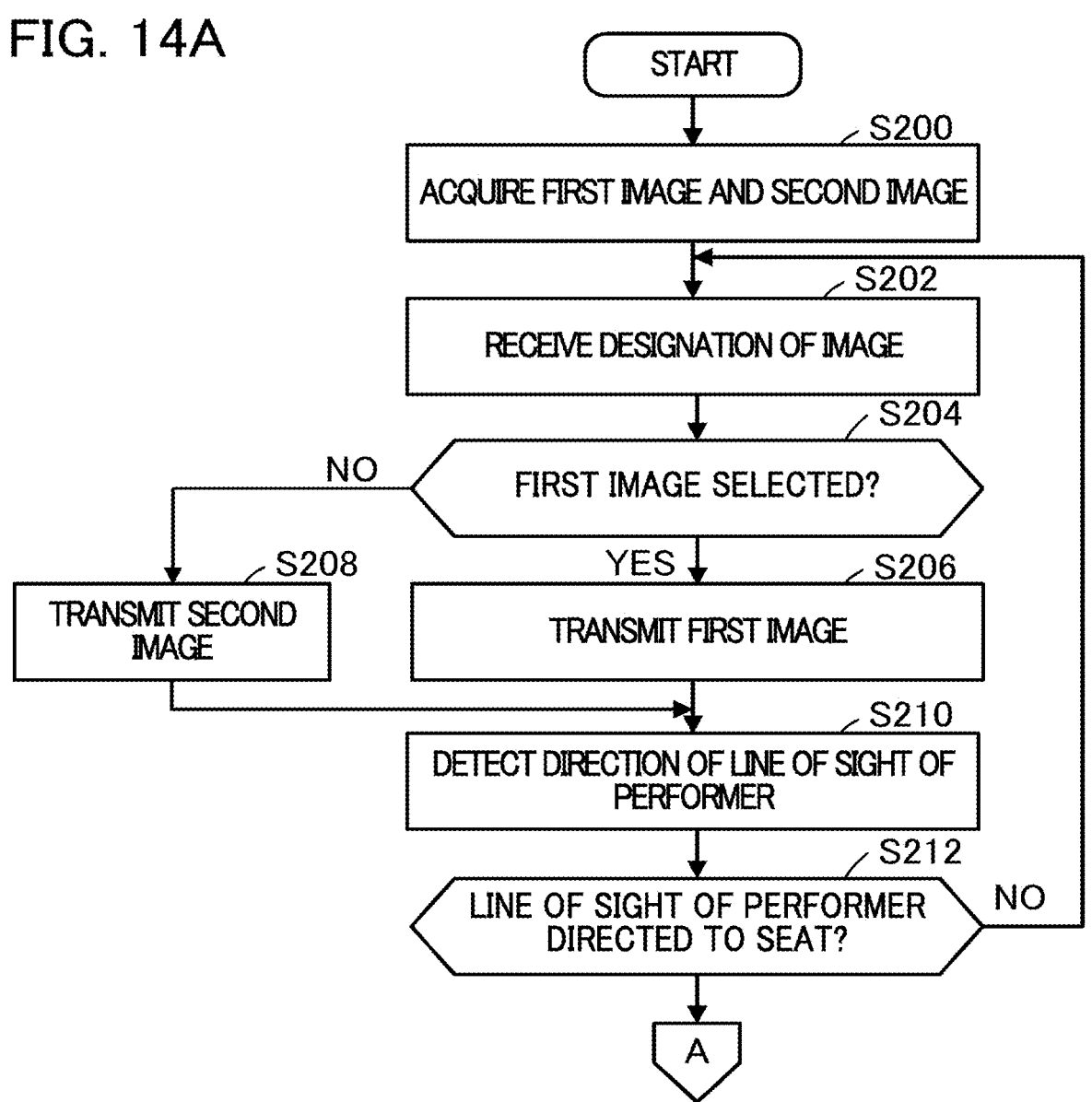
FIG. 14A is a flowchart illustrating an operation of a processing device 306B.
Figure 14B:
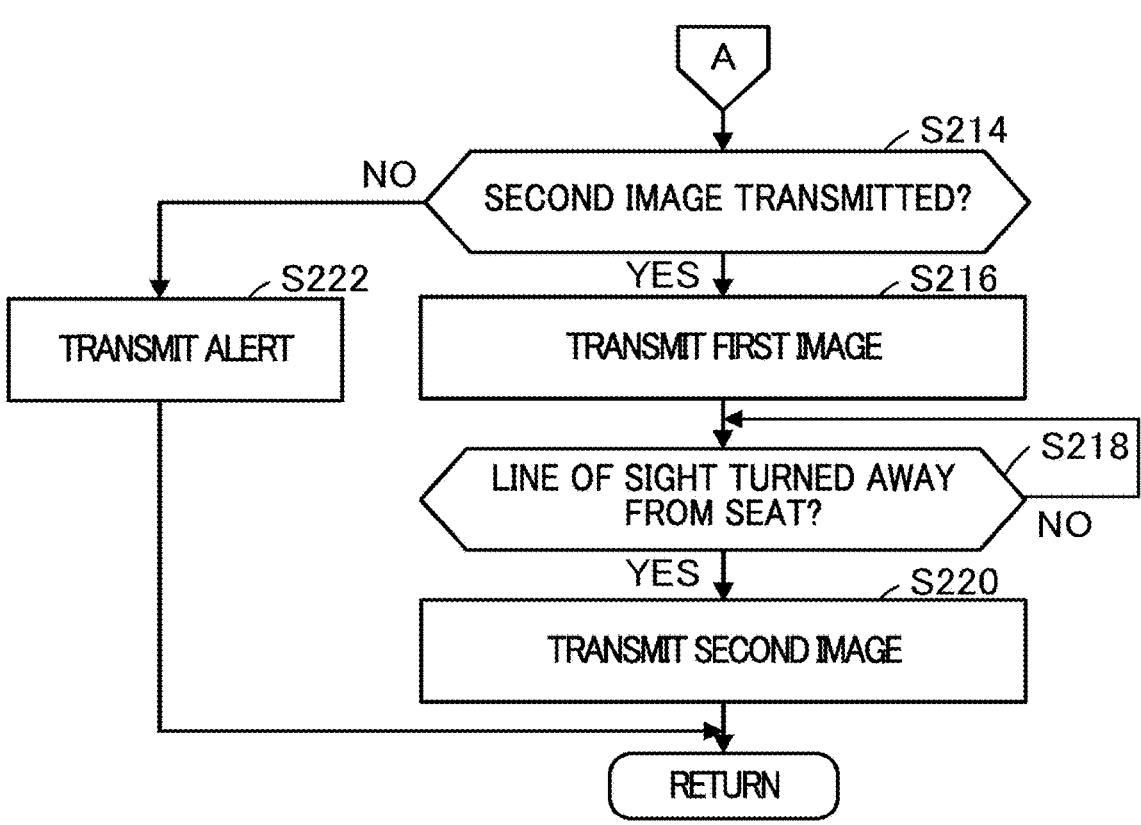

FIGS. 14 and 14B are flowcharts illustrating an operation of the processing device 306B. In the flowcharts of FIGS. 14 and 14B, focus is placed on image transmission to one terminal apparatus 40-I, for convenience of explanation. The processing device 306B performs processing described below in parallel with respect to the terminal apparatuses 40-1 to 40-7.

The processing device 306B functions as the image acquirer 310 and acquires the first image PC1 from the first image capture apparatus 10 and the second image PC2 from the second image capture apparatus 20 (Step S200). The acquisition of the first image PC1 and the second image PC2 is also continuously performed during subsequent processing.

The processing device 306B functions as the designation receiver 320 and receives a designation from a viewer Vi as to which one of the first image PC1 and the second image PC2 is to be transmitted to a terminal apparatus 40-$i$ (Step S202). When the first image PC1 is selected (Step S204: YES), the processing device 306B functions as the transmission controller 316B and transmits the first image PC1 to the terminal apparatus 40-$i$ (Step S206). When the first image PC1 is not selected (Step S204: NO), that is, when the second image PC2 is selected, the processing device 306B functions as the transmission controller 316B and transmits the second image PC2 to the terminal apparatus 40 (Step S208).

The processing device 306B functions as the line-of-sight detector 312B and detects the direction L of the line of sight of the performer P on the basis of the first image PC1 (Step S210). The processing device 306B functions as the transmission controller 316B and determines whether a seat Ci is on an extension of the line of sight of the performer P, that is, whether the line of sight of the performer P is directed to the seat Ci (Step S212). When the line of sight of the performer P is not directed to the seat Ci (Step S212: NO), the processing device 306B returns the processing to the Step S202.

When the line of sight of the performer P is directed to the seat Ci (Step S212: YES), the processing device 306B functions as the transmission controller 316B and determines whether the image that is being transmitted to a terminal apparatus 40-$i$ corresponding to the seat Ci is the second image PC2 (Step S214). When the image being transmitted to the terminal apparatus 40-$i$ is the second image PC2 (Step S214: YES), the processing device 306B transmits the first image PC1 to the terminal apparatus 40-$i$ (Step S216). That is, the transmission image to the terminal apparatus 40-$i$ is switched from the second image PC2 to the first image PC1. At that time, the processing device 306B may transmit an alert to the terminal apparatus 40-$i$.

The processing device 306B waits until the line of sight of the performer P is turned away from the seat Ci (Step S218: NO). In the meantime, the first image PC1 is transmitted to the terminal apparatus 40-$i$. When the line of sight of the performer P is turned away from the seat Ci (Step S218: YES), the processing device 306B functions as the transmission controller 316B and transmits the second image PC2 to the terminal apparatus 40-$i$ (Step S220). Subsequently, the processing device 306B returns the processing to Step S200.

When the image being transmitted to the terminal apparatus 40-$i$ is not the second image PC2 at Step S214 (Step S214: NO), that is, when the first image PC1 is being transmitted, the processing device 306B transmits an alert to the terminal apparatus 40-$i$ (Step S222). Subsequently, the processing device 306B returns the processing to Step S200.

As explained above, the first image capture apparatuses 10-1 to 10-7 are arranged corresponding to the seats C1 to C7, respectively, in the second embodiment. Accordingly, a viewer Vi can view a captured image (a first image PC1-$i$) from a seat Ci associated therewith at any timing, and can have a viewing experience close to that in an actual live show. Arrangement of the first image capture apparatuses 10-1 to 10-7 corresponding to the seats C1 to C7 enables more reliable capture of images in which the line of sight of the performer P is turned to the respective seat. Therefore, the level of satisfaction of a viewer Vi with an online live show is enhanced.

In the second embodiment, the direction L of the line of sight of the performer P is detected on the basis of the first images PC1-1 to PC1-7 captured by the first image capture apparatuses 10-1 to 10-7, respectively. Therefore, the direction L of the line of sight of the performer P is detected with greater accuracy than in a case in which the line of sight of the performer P is tracked based on an image captured by one image capture apparatus.

C. Modifications

Modified modes of the embodiments described above are illustrated below. Two or more modes optionally selected from the following modified modes may be combined with one another as appropriate within a range in which there is no conflict.

C1. First Modification

In a first modification, the configuration of the second embodiment illustrated in FIGS. 9 to 11 is used. In the embodiments described above, a case in which the performer P is one person has been described. In a case in which a performer P is a member of a band, a group, or the like, a plurality of the performers P may be on the stage S. In this case, depending on the number of the performers P, the line of sight of one of the performers P may be frequently directed to a seat Ci. A viewer Vi may be interested only in a specific one of the members. That is, if the control described above is executed on all the performers P, there is a possibility that the control will undesirably cause a viewer Vi to be uncomfortable in viewing the performance, or that the level of satisfaction of a viewer Vi will be decreased.

Accordingly, when there are multiple performers P on the stage S, a viewer Vi may be enabled to designate a performer P, the image of whom is switched to the first image PC1 at the time of turning of the eyes on a seat Ci. For example, a first performer P1, and a second performer P2 performing with the first performer P1 are on the stage S. The image transmission apparatus 30B illustrated in FIG. 11 receives a designation of the first performer P1 or the second performer P2 from a viewer Vi through the designation receiver 320. The designation receiver 320 is one example of a receiver. When the first performer P1 is designated by a viewer Vi, a first image capture apparatus 10-$i$ tracks the first performer P1 to capture the first image with the first performer P1 included. When the second performer P2 is designated by a viewer Vi, a first image capture apparatus 10-$i$ tracks the second performer P2 to capture the first image with the second performer P2 included.

The line-of-sight detector 312B detects the direction L of the line of sight of the first performer P1 and the direction L of the line of sight of the second performer. The transmission controller 316B transmits the first image PC1 to a terminal apparatus 40-$i$ based on the first performer P1 being designated by a viewer Vi and the line of sight of the first performer P1 having turned on a seat Ci. The transmission controller 316B transmits the first image PC1 to a terminal apparatus 40-$i$ based on the second performer P2 being designated by a viewer Vi and the line of sight of the second performer P2 having turned on a virtual seat Ci.

In other words, the transmission controller 316B switches the image to be transmitted to a terminal apparatus 40-$i$ to the first image PC1 when a performer P (hereinafter, "designated performer PX") designated by a viewer Vi turns the line of sight on a seat Ci. On the other hand, when performers P other than the designated performer PX turn the line of sight on the seat Ci, the transmission controller 316B does not perform switching of the image to be transmitted to the terminal apparatus 40-$i$.

According to the first modification, switching to the first image PC1 is performed only when a performer P designated by a viewer Vi turns the line of sight on a seat Ci. Accordingly, frequent switching of the image to be transmitted to a terminal apparatus 40-$i$ can be avoided. Furthermore, a viewer Vi can view a performance of a performer P to which the viewer Vi wishes to pay attention, without missing anything.

In the first modification, the configuration of the second embodiment is used. However, for example, when there is one viewer Vi or when all the viewers Vi designate the same performer P (for example, the first performer P1), the configuration of the first embodiment may be used.

C2. Second Modification

In the embodiments described above, the transmission controller 316A switches the image to be transmitted to a terminal apparatus 40-$i$ to the first image PC1 at a timing when the line of sight of the performer P is turned on a seat Ci. The present invention is not limited thereto and the image may be switched to the first image PC1 before the line of sight of the performer P is turned on a seat Ci.

Figure 15:
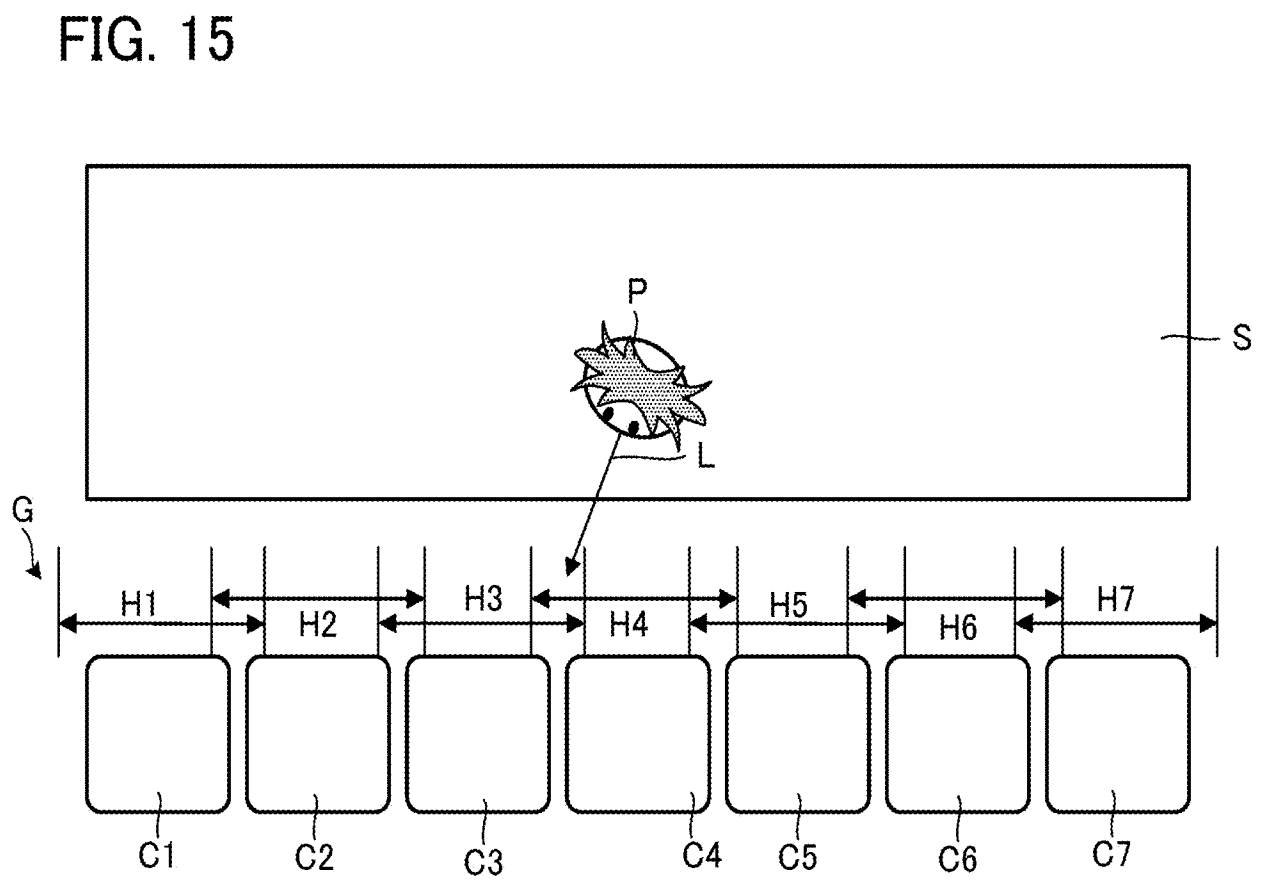

FIG. 15 is an explanatory diagram schematically illustrating a second modification. In FIG. 15, illustrations of the first image capture apparatus 10 and the second image capture apparatus 20 are omitted. Image switching ranges H1 to H7 are set to the seats C1 to C7, respectively. The extent of each of the image switching ranges H1 to H7 is set to be wider in the right-left direction than the range of each of the seats C1 to C7. For example, when the line of sight of the performer P enters the image switching range H1, the first image PC1 is transmitted to the terminal apparatus 40-1. As described above, since the extent of each of the image switching ranges H1 to H7 is set to be wider than the range of each of the seats C1 to C7, the transmission of the first image PC1 to the terminal apparatus 40-1 is started at an earlier timing than when the performer P turns the line of sight to the seat C1. The transmission of the first image PC1 to the terminal apparatus 40-1 is not completed until some time has elapsed after the line of sight of the performer P is turned away from the seat C1. For example, when the performer P directs the line of sight to an overlapped range of the image switching ranges H3 and H4 as in FIG. 15, the first image PC1 is transmitted to the terminal apparatus 40-3 corresponding to the seat C3 and the terminal apparatus 40-4 corresponding to the seat C4.

According to the second modification, a viewer Vi can see how the performer P turns the eyes to a seat Ci corresponding the viewer Vi and can more realistically feel a sense of establishing eye contact with the performer P.

C3. Third Modification

In the embodiments described above, the direction L of the line of sight of the performer P is detected on the basis of the first image PC1 captured by the first image capture apparatus 10 or the second image PC2 captured by the second image capture apparatus 20. The present invention is not limited thereto and a third image capture apparatus that captures an image for detecting the direction L of the line of sight of the performer P may be installed. The third image capture apparatus may be, for example, an image capture apparatus placed at a position closer to the stage S than the first image capture apparatus 10. The third image capture apparatus may be, for example, an image capture apparatus that is mounted to XR (Extended Reality) glasses worn by the performer P during a performance. Alternatively, the third image capture apparatus may be, for example, an image capture apparatus mounted on an eye tracker dedicated to tracking of the line of sight of the performer P.

According to this modification, since the direction L of the line of sight of the performer P is detected on the basis of an image dedicated to detection of the direction L of the line of sight of the performer P, the direction L of the line of sight of the performer P can be more accurately detected. Furthermore, the first image capture apparatus 10 or the second image capture apparatus 20 does not need to always image the performer P and, for example, imaging of subjects other than the performer P in accordance with production during a performance can be performed, which improves the flexibility in visual expressions of an online live show.

The direction L of the line of sight of the performer P may be calculated on the basis of, for example, a detection value of a sensor worn on the head of the performer P, without detecting the direction L of the line of sight of the performer P from an image. For example, an inertial measurement unit (IMU) or a geomagnetic sensor can be used as the sensor in this case.

According to this modification, processing load of the processing device 306A or 306B can be reduced as compared to a case in which image processing is performed.

D: Other Matters (1) Each of the functions exemplified in FIG. 5 and FIG. 11 is realized by an optional combination of hardware and software. The method for realizing each function is not particularly limited to any specific one. Each function may be realized by using one device combined physically or logically or realized by using a device configured by directly or indirectly connecting (for example, using wired communication or wireless communication) two or more devices physically or logically that are separated from each other. Each function may be realized by combining software with the one device or the plural devices mentioned above.

(2) In the present specification, the term "apparatus" may be replaced with another term such as circuit, device, or unit.

(3) In each of the first embodiment, the second embodiment, and the first to third modifications, the storage device 305 may be formed of at least one of an optical disk such as a CD-ROM (Compact Disc ROM), a hard disk drive, a flexible disk, a magneto-optical disk (for example, a compact disk, a digital versatile disk, or a Blu-ray (Registered Trademark) disk), a smart card, a flash memory (for example, a card, a stick, or a key drive), a floppy (Registered Trademark) disk, a magnetic strip, and the like. Programs may be transmitted from a network via a telecommunication line.

(4) Each of the first embodiment, the second embodiment, and the first to third modifications may be applied to at least one of LTE (Long Term Evolution), LTE-A (LTA-Advanced), SUPER 3G, IMT-Advanced, 4G (4th generation mobile communication system), 5G (5th generation mobile communication system), 6th generation mobile communication system (6G), xth generation mobile communication system (xG) (x is, for example, an integer or a decimal), FRA (Future Radio Access), NR (new Radio), New radio access (NX), Future generation radio access (FX), W-CDMA (Registered Trademark), GSM (Registered Trademark), CDMA2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), a system using another appropriate system, and a next-generation system that is extended, modified, created, and defined based on these systems. A plurality of systems may be combined (for example, a combination of at least one of LTE and LTE-A with 5G) with one another to be applied.

(5) The processing procedures, sequences, flowcharts, and the like exemplified in the first embodiment, the second embodiment, and the first to third modifications may be rearranged as long as there is no conflict. For example, the method described in the present specification presents elements of various steps in an exemplary sequence and is not limited to the specific sequence presented.

(6) In each of the first embodiment, the second embodiment, and the first to third modifications, input and output information and the like may be stored in a specific location (for example, a memory) or may be managed using a management table. Information to be input and output and the like may be overwritten, updated, or added. Output information and the like may be deleted. Input information and the like may be transmitted to another device.

(7) In each of the first embodiment, the second embodiment, and the first to third modifications, determination may be made based on a value (0 or 1) expressed by one bit, based on a truth value (Boolean: true or false), or based on comparison of numerical values (for example, comparison with a predetermined value).

(8) Regardless of whether the programs exemplified in each of the first embodiment, the second embodiment, and the first to third modifications are referred to as software, firmware, middleware, microcode, or hardware description language, or some other name, the programs should be interpreted broadly to mean instruction, instruction set, code, code segment, program code, subprogram, software module, application, software application, software package, routine, subroutine, object, executable file, execution thread, procedure, function, and the like. Software, instruction, and the like may be transmitted and received via a transmission medium. For example, when software is transmitted from a website, a server, or another remote source using at least one of a wired technology (such as coaxial cable, fiber optic cable, twisted pair, and Digital Subscriber Line (DSL)) and a wireless technology (such as infrared light or microwaves), at least one of the wired and wireless technologies is included in the definition of the transmission medium.

(9) Information and the like described in each of the first embodiment, the second embodiment, and the first to third modifications may be expressed by using any of various different technologies. For example, data, information and the like mentioned throughout the above descriptions may be expressed by voltage, current, electromagnetic wave, magnetic field, magnetic particle, optical field, and photon or an optional combination thereof. The terms described in the present specification and terms necessary for understanding the present specification may be replaced with terms having the same or similar meanings.

(10) In each of the first embodiment, the second embodiment, and the first to third modifications, the terms "system" and "network" are used interchangeably.

(11) In each of the first embodiment, the second embodiment, and the first to third modifications, the terminal apparatuses 40 may be mobile stations. There are cases in which, by those skilled in the art, the mobile stations are referred to as subscriber stations, mobile units, subscriber units, wireless units, remote units, mobile devices, wireless devices, wireless communication devices, remote devices, mobile subscriber stations, access terminals, mobile terminals, wireless terminals, remote terminals, handsets, user agents, mobile clients, clients, or some other appropriate terms.

(12) The mobile stations may be referred to as transmitting devices, receiving devices, or communication devices. Each of the mobile stations may be a device such as a device mounted on a moving body or a moving body itself. The moving body represents a movable object. The moving speed of the moving body may be freely chosen. The moving body is stoppable. The moving body includes, for example, a vehicle, a transport vehicle, an automobile, a motorcycle, a bicycle, a connected car, an excavator, a bulldozer, a wheel loader, a dump track, a forklift, a train, a bus, a cart, a rickshaw, and a ship (ship and other watercraft), an airplane, a rocket, a satellite, a drone (Registered Trademark), a multi-copter, a quad-copter, a balloon, and an object mounted thereat, and is not limited thereto. The moving body may be a moving body that runs autonomously based on operation instructions. The moving body may be a vehicle (for example, a car or an airplane), a moving body that moves in an unmanned manner (for example, a drone or a self-driving car), or a robot (manned or unmanned). The mobile stations include devices that do not necessarily move during a communication operation. For example, the mobile stations may be IoT (Internet of Things) devices such as sensors.

(13) In each of the first embodiment, the second embodiment, and the first to third modifications, the terms "determining" or "determining" may encompass a wide variety of actions. "Determining" may include regarding some actions such as judging, calculating, computing, processing, deriving, investigating, looking up, search, inquiry (for example, searching in a table, database, or other data structures), and ascertaining, as it has been "determined." "Determining" may also include regarding some actions such as receiving (for example, receiving information), transmitting (for example, transmitting information), input, output, and accessing (for example, accessing data in a memory), as it has been "determined." "Determining" may also include regarding some actions such as resolving, selecting, choosing, establishing, and comparing, as it has been "determined." That is, "determining" may include regarding some actions have been "determined." In addition, "determining" may be read as "assuming," "expecting," "considering," and the like.

(14) In each of the first embodiment, the second embodiment, and the first to third modifications, the term "connected" or any variations thereof means any direct or indirect connection or coupling between two or more elements and one or more intermediate elements may be present between two elements that are "connected" or "coupled" to each other. The coupling or connection between elements may be physical, logical, or a combination thereof. For example, "connection" may be understood as "access." When this term is used in the present disclosure, two elements are regarded to be "connected" or "coupled" to each other by using at least one of one or more wires, cables, printed electrical connections, and as some non-limiting and non-exhaustive examples, by using electromagnetic energy having wavelengths in radio-frequency regions, microwave regions, and light (both visible and invisible) regions, and the like.

(15) In each of the first embodiment, the second embodiment, and the first to third modifications, the description "based on" does not mean "based only on" unless explicitly stated otherwise. In other words, the description "based on" means both "based only on" and "based at least on."

(16) Any reference to elements using a designation such as "first" and "second" used in the present specification generally does not limit the amount or order of those elements. Such designations may be used in the present specification as a convenient way to distinguish between two or more elements. Accordingly, reference to first and second elements does not imply that only two elements may be employed therein, or that the first element must in any way precede the second element.

(17) In each of the first embodiment, the second embodiment, and the first to third modifications, when terms "include," "including," and variations thereof are used in the present specification or the claims, these terms are intended to be inclusive in a manner similar to the term "comprising." In addition, the term "or" used in the present specification or the claims is not intended to be an exclusive OR.

(18) Throughout this application, for example, during translation, if articles such as a, an, and the in English are added, in this disclosure, these articles shall include a plurality of the noun following these articles.

(19) It will be obvious to those skilled in the art that the present invention is not limited to the embodiments described in the present specification. The present invention can be implemented as modifications and variations without departing from the spirit and scope of the present invention as defined by the descriptions in the claims. Accordingly, the descriptions in this specification are for illustrative purposes and are not of any restrictive significance to the present invention. In addition, a plurality of modes selected from the modes exemplified in the present specification may be combined with one another.

DESCRIPTION OF REFERENCE SIGNS 1, 2 . . . image transmission system, 10, 10-1 to 10-7(10-$i$) . . . first image capture apparatus, 20 . . . second image capture apparatus, 30A, 30B . . . image transmission apparatus, 40-1 to 40-7(40-$i$) . . . terminal apparatus, 50 . . . movement mechanism, 301 . . . input device, 302 . . . display device, 303 . . . communication device, 304 . . . image input interface, 305 . . . storage device, 306A, 306B . . . processing device, 307 . . . bus, 310 . . . image acquirer, 312A, 312B . . . line-of-sight detector, 314 . . . movement controller, 316A, 316B . . . transmission controller, 320 . . . designation receiver, C1 to C7(Ci) . . . seat, G . . . theater, L . . . direction of line of sight, N . . . communication network, P . . . performer, PC1 . . . first image, PC2 . . . second image, S . . . stage, V1 to V7(Vi) . . . viewer.

The invention claimed is:

1. An image transmission system comprising:
a first image capture apparatus configured to capture a first image of a performer in a real space from a position of a virtual first seat that has been set in the real space;
a second image capture apparatus configured to capture a second image including the performer from a position different from the position of the first image capture apparatus; and
processing circuitry configured to
transmit the second image to a terminal apparatus of a viewer associated with the virtual first seat; and
detect a direction of line of sight of the performer,
wherein the processing circuitry is configured to transmit the first image to the terminal apparatus based on the direction of the line of sight of the performer having turned toward the virtual first seat.

2. The image transmission system according to claim 1, further comprising:
a movement mechanism configured to move the first image capture apparatus,
wherein the processing circuitry is configured to control the movement mechanism,
the real space has a virtual second seat at a position different from the position of the virtual first seat, and
the processing circuitry is configured to cause the movement mechanism to move the first image capture apparatus between the virtual first seat and the virtual second seat based on the direction of the line of sight of the performer detected by the detector.

3. The image transmission system according to claim 2, wherein the processing circuitry is configured to detect the direction of the line of sight of the performer based on the second image.

4. The image transmission system according to claim 3, wherein the processing circuitry is configured to transmit an alert to the terminal apparatus substantially at a same time as a time when the first image is transmitted to the terminal apparatus, or before the first image is transmitted to the terminal apparatus.

5. The image transmission system according to claim 2, wherein the processing circuitry is configured to transmit an alert to the terminal apparatus substantially at a same time as a time when the first image is transmitted to the terminal apparatus, or before the first image is transmitted to the terminal apparatus.

6. The image transmission system according to claim 1, wherein the first image capture apparatus is fixed at the position of the virtual first seat.

7. The image transmission system according to claim 6, wherein the processing circuitry is configured to detect the line of sight of the performer based on the first image.

8. The image transmission system according to claim 7, wherein the processing circuitry is configured to transmit an alert to the terminal apparatus substantially at a same time as a time when the first image is transmitted to the terminal apparatus, or before the first image is transmitted to the terminal apparatus.

9. The image transmission system according to claim 6, wherein the processing circuitry is configured to transmit an alert to the terminal apparatus substantially at a same time as a time when the first image is transmitted to the terminal apparatus, or before the first image is transmitted to the terminal apparatus.

10. The image transmission system according to claim 1, wherein the processing circuitry is configured to transmit an alert to the terminal apparatus substantially at a same time as a time when the first image is transmitted to the terminal apparatus, or before the first image is transmitted to the terminal apparatus.

11. The image transmission system according to claim 1, wherein:
the performer is either a first performer or a second performer performing with the first performer,
the processing circuitry is configured to receive a designation of the first performer or the second performer from the viewer,
the first image capture apparatus is configured to:
capture the first image with the first performer included, when the viewer designates the first performer, and
capture the first image with the second performer included, when the viewer designates the second performer,
the processing circuitry is configured to
detect line of sight of the first performer and line of sight of the second performer,
transmit the first image to the terminal apparatus based on a designation of the first performer by the viewer and based on the line of sight of the first performer having turned toward the virtual first seat, and
transmit the first image to the terminal apparatus based on a designation of the second performer by the viewer and based on the line of sight of the second performer having turned toward the virtual first seat.

12. An image transmission apparatus comprising:

processing circuitry configured to acquire a first image of a performer in a real space, the first image being captured by a first image capture apparatus from a position of a virtual first seat that has been set in the real space, acquire a second image including the performer, the second image being captured by a second image capture apparatus from a position different from the position of the first image capture apparatus, transmit the second image to a terminal apparatus of a viewer associated with the virtual first seat, and detect a direction of line of sight of the performer, wherein the processing circuitry is configured to transmit the first image to the terminal apparatus based on the line of sight of the performer having turned toward the virtual first seat.

\* \* \* \* \*